US012097634B2

(12) United States Patent
Gereg

(10) Patent No.: US 12,097,634 B2
(45) Date of Patent: Sep. 24, 2024

(54) CLAMPING ASSEMBLIES FOR SECURING KNIVES TO SLICING MACHINES, SLICING MACHINES EQUIPPED THEREWITH, AND TOOLS FOR USE THEREWITH

(71) Applicant: Urschel Laboratories, Inc., Chesterton, IN (US)

(72) Inventor: Dustin J. Gereg, Valparaiso, IN (US)

(73) Assignee: Urschel Laboratories, Inc., Chesterton, IN (US)

( * ) Notice: Subject to any disclaimer, the term of this patent is extended or adjusted under 35 U.S.C. 154(b) by 0 days.

(21) Appl. No.: 17/841,878

(22) Filed: Jun. 16, 2022

(65) Prior Publication Data

US 2022/0402159 A1 Dec. 22, 2022

Related U.S. Application Data

(60) Provisional application No. 63/211,381, filed on Jun. 16, 2021.

(51) Int. Cl.
*B26D 7/26* (2006.01)
*B26D 7/06* (2006.01)

(52) U.S. Cl.
CPC .......... *B26D 7/2614* (2013.01); *B26D 7/0691* (2013.01); *B26D 2210/02* (2013.01)

(58) Field of Classification Search
CPC ........................... B26D 7/2614; B26D 7/0691; B26D 2210/02; B26D 1/03; B26D 3/26; Y10T 83/6473; Y10T 83/9498
See application file for complete search history.

(56) References Cited

U.S. PATENT DOCUMENTS

| | | | |
|---|---|---|---|
| 3,139,128 A | 6/1964 | Urschel et al. | |
| 3,139,129 A | 6/1964 | Urschel et al. | |
| 3,395,742 A | 8/1968 | Sanders | |
| 4,590,835 A * | 5/1986 | Matsuo | B26D 7/2614 83/858 |
| 5,694,824 A | 12/1997 | Jacko et al. | |
| 6,968,765 B2 | 11/2005 | King | |
| 7,658,133 B2 | 2/2010 | Jacko et al. | |

(Continued)

OTHER PUBLICATIONS

International Search Report and Written Opinion for International Application No. PCT/US2022/033760, dated Sep. 30, 2022, 13 pages.

*Primary Examiner* — Jonathan G Riley
(74) *Attorney, Agent, or Firm* — Hartman Global IP Law; Gary M. Hartman; Domenica N. S. Hartman

(57) ABSTRACT

Clamping assemblies for securing knives to slicing machines, slicing machines equipped therewith, and tools for removing and installing knives on slicing machines. Such a clamping assembly may include a knife holder, a knife supported on a surface of the knife holder, and a clamp that clamps the knife to the knife holder. The clamp has a knife-engaging portion and a base portion. A cam rod applies a clamping load to the clamp to secure the knife to the knife holder. The cam rod has a camming surface that engages the base portion of the clamp when the cam rod is rotated to a clamping position to clamp the knife against the knife holder, and a radial concavity sized to accommodate the base portion of the clamp such that the base portion is loosely received within the radial concavity when the radial concavity faces the clamp in an open position thereof.

9 Claims, 25 Drawing Sheets

(56) References Cited

U.S. PATENT DOCUMENTS

| | | | | |
|---|---|---|---|---|
| 8,161,856 | B2 | 4/2012 | Jacko et al. | |
| 9,193,086 | B2 | 11/2015 | Jacko et al. | |
| 9,469,041 | B2 | 10/2016 | King et al. | |
| 9,840,015 | B2 | 12/2017 | King et al. | |
| 9,849,600 | B2 | 12/2017 | King et al. | |
| 10,456,943 | B2 | 10/2019 | King et al. | |
| 10,562,203 | B2 | 2/2020 | Jacko | |
| 10,632,639 | B2 | 4/2020 | Fant | |
| 10,780,602 | B2 | 9/2020 | Gereg et al. | |
| 10,786,922 | B2 | 9/2020 | Gereg et al. | |
| 10,807,268 | B2 | 10/2020 | Gereg et al. | |
| 10,843,363 | B2 | 11/2020 | Gereg | |
| 10,933,552 | B2 | 3/2021 | Baxter et al. | |
| 2012/0272539 | A1 | 11/2012 | Khan et al. | |
| 2016/0297090 | A1 | 10/2016 | Nazar et al. | |
| 2018/0126581 | A1* | 5/2018 | Jacko | B26D 7/2614 |
| 2018/0229390 | A1* | 8/2018 | Gereg | B26D 7/2614 |
| 2018/0333886 | A1* | 11/2018 | Gereg | B26D 7/2614 |
| 2019/0210239 | A1 | 7/2019 | Baxter et al. | |
| 2019/0329437 | A1* | 10/2019 | Gereg | B26D 7/2614 |
| 2019/0375126 | A1* | 12/2019 | Baxter | B26D 7/2614 |
| 2020/0262095 | A1 | 8/2020 | Gereg et al. | |

* cited by examiner

CLAMPING ASSEMBLIES FOR SECURING KNIVES TO SLICING MACHINES, SLICING MACHINES EQUIPPED THEREWITH, AND TOOLS FOR USE THEREWITH

CROSS-REFERENCE TO RELATED APPLICATIONS

This application claims the benefit of U.S. Provisional Application No. 63/211,381, filed Jun. 16, 2021, the contents of which are incorporated herein by reference.

BACKGROUND OF THE INVENTION

The present invention generally relates to machines for cutting products, including but not limited to slicing food products. The invention particularly relates to clamping assemblies for securing knives to slicing machines, slicing machines equipped therewith, and tools for removing and installing knives on slicing machines.

Various types of equipment are known for slicing, shredding and granulating food products, as nonlimiting examples, vegetables, fruits, dairy products, and meat products. Widely used machines for this purpose are commercially available from Urschel Laboratories, Inc., and include machines under the name Model CC®. The Model CC® machines are centrifugal-type slicers capable of slicing a wide variety of products at high production capacities. The Model CC® line of machines is particularly adapted to produce uniform slices, strip cuts, shreds, and granulations. Certain configurations and aspects of Model CC® machines are represented in U.S. Pat. Nos. 3,139,128, 3,139,129, 5,694,824, 6,968,765, 7,658,133, 8,161,856, 9,193,086, 10,456,943, 10,562,203, 10,632,639, and 10,933,552 and U.S. Patent Application Publication No. 2019/0210239, the entire contents of which are incorporated herein by reference.

FIG. 1 schematically represents a cross-sectional view of a machine 10 that is representative of a Model CC® machine. The machine 10 includes a generally annular-shaped cutting head 12 and an impeller 14 coaxially mounted within the cutting head 12. The impeller 14 has an axis 17 of rotation that coincides with the center axis of the cutting head 12, and is rotationally driven about its axis 17 through a shaft (not shown) that is enclosed within a housing 18 and coupled to a gear box 16. The cutting head 12 is mounted on a support ring 15 above the gear box 16 and remains stationary as the impeller 14 rotates. Products are delivered to the cutting head 12 and impeller 14 through a feed hopper 11 located above the impeller 14. In operation, as the hopper 11 delivers products to the impeller 14, centrifugal forces cause the products to move outward into engagement with cutting knives (not shown) that are mounted along the circumference of the cutting head 12. The impeller 14 comprises generally radially oriented paddles 13, each having a face that engages and directs the products radially outward toward and against the knives of the cutting head 12 as the impeller 14 rotates. Other aspects pertaining to the construction and operation of Model CC® machines, including various embodiments thereof, can be appreciated from the aforementioned prior patent documents incorporated herein by reference.

FIGS. 2 and 3 are, respectively, isolated and fragmentary bottom views of a particular but nonlimiting example of a cutting head 12 that has been used with Model CC® slicing machines, including the machine 10 schematically represented in FIG. 1. The cutting head 12 represented in FIGS. 2 and 3 will be described hereinafter in reference to the machine 10 of FIG. 1 equipped with an impeller 14 as described in reference to FIG. 1. On the basis of the coaxial arrangement of the cutting head 12 and the impeller 14, relative terms including but not limited to "axial," "circumferential," "radial," etc., and related forms thereof may be used below to describe the cutting head 12 represented in FIGS. 2 and 3.

In FIG. 2, the cutting head 12 can be seen as generally annular-shaped with cutting knives 20 mounted and circumferentially spaced apart along its perimeter. Each knife 20 projects radially inward in a direction generally opposite the direction of rotation of the impeller 14 within the cutting head 12, and the leading edge of each knife 20 defines a cutting edge at the innermost radial extremity of the knife 20. The cutting head 12 further comprises lower and upper support members, represented in FIG. 2 as rings 22 and ring 24, to and between which circumferentially-spaced support segments, referred to herein as shoes 26, are secured with fasteners 34.

A knife 20 can be associated with each shoe 26, in which case the shoes 26 may be referred to as cutting stations of the cutting head 12. The knives 20 of the cutting head 12 are represented in FIGS. 2 and 3 as being individually secured with clamping assemblies 28 to their respective shoes 26. Each clamping assembly 28 includes a knife holder 30 mounted to a shoe 26 and between the support rings 22 and 24, and a clamp 32 positioned on the radially outward-facing side of the holder 30 to secure a knife 20 thereto. Each knife 20 is supported by a radially outer surface of one of the knife holders 30, and the corresponding clamp 32 overlies the holder 30 so that the knife 20 is between the outer surface of the holder 30 and a radially inward surface of the clamp 32 that faces the holder 30. By forcing the clamp 32 toward the holder 30, for example, with bolts 36, the clamp 32 applies a clamping force to the knife 20 adjacent its cutting edge. As an alternative to the use of bolts, an eccentric cam rod can be used as a quick-clamping feature to apply the clamping force to the clamp 32, nonlimiting examples of which include U.S. Pat. Nos. 7,658,133, 10,562,203, 10,780,602, 10,786,922, 10,807,268, and 10,933,552, the entire contents of which are incorporated herein by reference.

FIGS. 2 and 3 further show a gate 38 secured to each shoe 26. A food product crosses the gate 38 prior to encountering the knife 20 mounted to the succeeding shoe 26, and together the cutting edge of a knife 20 and a trailing edge of the preceding gate 38 define a gate opening 40 (FIG. 3) that determines the thickness of a slice produced by the knife 20.

FIGS. 2 and 3 represent the knives 20 as having straight cutting edges for producing flat slices, and as such may be referred to herein as "flat" knives, though the cutting head 12 can use knives of other shapes. As a nonlimiting example, the cutting head 12 may be configured to use "shaped" knives, including but not limited to knives characterized by a periodic pattern of alternating peaks and valleys when viewed edgewise, to produce corrugated, strip-cut, shredded, and granulated products. As another nonlimiting example, the cutting head 12 may be configured to use knives developed to produce what is known as a strip or julienne cut. Such a cut generally results in a product being cut into long strips. Nonlimiting examples of julienne-type knives are disclosed in U.S. Pat. Nos. 3,395,742, 9,469,041, 9,840,015, 9,849,600, and 10,843,363, each of which may be used in various machines including the aforementioned Urschel Model CC® machines. As defined herein, a strip-cut (or julienne-type) knife may be flat or shaped, but with the further inclusion of julienne "tab" blades spaced along the knife adjacent its cutting edge and projecting out of the plane of the knife to produce a desired strip/julienne cross section. FIG. 4 represents a nonlimiting example of a flat strip-cut knife 20 created as an assembly that comprises a flat (planar) slicing knife 20A that defines a cutting edge 42, and a second knife 20B (referred to herein as a julienne or strip knife) that has a flat base 44 and individual julienne tab blades 46 that are oriented roughly perpendicular to the base 44 and, when the slicing knife 20A and strip knife 20B are assembled as shown, are oriented roughly perpendicular to the cutting edge 42 of the slicing knife 20A to produce strip-cut (julienne-cut) flat food products. The tab blades 46 are represented as set back from the cutting edge 42 of the slicing knife 20A, with each tab blade 46 defining a cutting edge 48. In use, the cutting edge 42 of the slicing knife 20A cuts a slice off of a product, followed by the tab blades 46 that cut the slice into strips. The knife 20 depicted in FIG. 4 is representative of what is referred to herein as a handleless knife due to the lack of a handle extending from one of the longitudinal ends of the knife 20.

While centrifugal-type slicers of the type represented by the Model CC® have performed extremely well for their intended purposes, further improvements are continuously desired and sought, including improvements relating to the maintenance of the machines. Nonlimiting examples include the cleaning and replacement of the knives 20, 20A, and 20B, the clamps 32, and/or the knife holders 30, whose leading (cutting) edges are vulnerable to damage, for example, from impacts with stones, sand, and other debris that often accompany food products such as potatoes.

BRIEF SUMMARY OF THE INVENTION

The present invention provides clamping assemblies for securing knives to slicing machines, slicing machines equipped therewith, and tools for removing and installing knives on slicing machines.

According to an aspect of the invention, a clamping assembly includes a knife holder having a surface and a leading edge, a knife supported on the surface of the knife holder and having a cutting edge that protrudes from the leading edge of the knife holder, and a clamp arranged relative to the knife holder and knife to clamp the knife to the knife holder. The clamp has a longitudinal direction, a leading edge, a trailing edge, a knife-engaging portion adjacent the leading edge of the clamp, and a base portion adjacent the trailing edge of the clamp. At least part of the knife-engaging portion has a shape complementary to the knife. The knife-engaging portion and the base portion of the clamp each have a width in a direction parallel to the longitudinal direction of the clamp, and the width of the base portion being less than the width of the knife-engaging portion. The clamping assembly further includes a cam rod configured to apply a clamping load to the clamp to secure the knife to the knife holder. The cam rod is rotatable about a longitudinal axis thereof and has a longitudinal length, a camming surface that engages the base portion of the clamp when the cam rod is rotated to a clamping position to force the clamp into engagement with the knife and clamp the knife against the knife holder, and a radial concavity that has a longitudinal length and defines a recessed surface spanning at least a portion of the longitudinal length of the cam rod. The radial concavity is sized to accommodate the base portion of the clamp, and the width of the base portion is less than the longitudinal length of the radial concavity such that the base portion of the clamp is loosely received within the radial concavity when the cam rod is rotated so that the radial concavity faces the clamp in an open position thereof.

According to another aspect of the invention, slicing machines are provided that are equipped with one or more clamping assemblies having elements as described above.

According to other aspects of the invention, tools are provided for installing and removing clamps and/or knives of a clamping assembly, including but not limited to clamping assemblies having elements as described above. Such a tool includes a base having a surface and at least a first bore open at the surface. A first pin is received in the first bore and has a distal portion disposed adjacent the surface of the base. The first pin is biased so that the distal portion of the first pin is biased toward the surface of the base, and at least a first magnet is disposed in at least one of the distal portion of the first pin and the surface of the base.

Technical effects of clamping assemblies having features as described above include the ability to facilitate the complete removal of a clamp and/or knife from a slicing machine for the purpose of cleaning or replacing components of the machine. The clamping assemblies are particularly well suited for (but not limited to) removing a clamp that secures a strip-cut knife through the action of an eccentric cam rod. Additionally, tools having features as described above also facilitate the complete removal of clamps and/or knives, including (but not limited to) nonhandled strip-cut knives, from slicing machines, providing a quick-change capability to facilitate their cleaning and replacement.

Other aspects and advantages of this invention will be appreciated from the following detailed description.

DETAILED DESCRIPTION OF THE INVENTION

Figure 1:
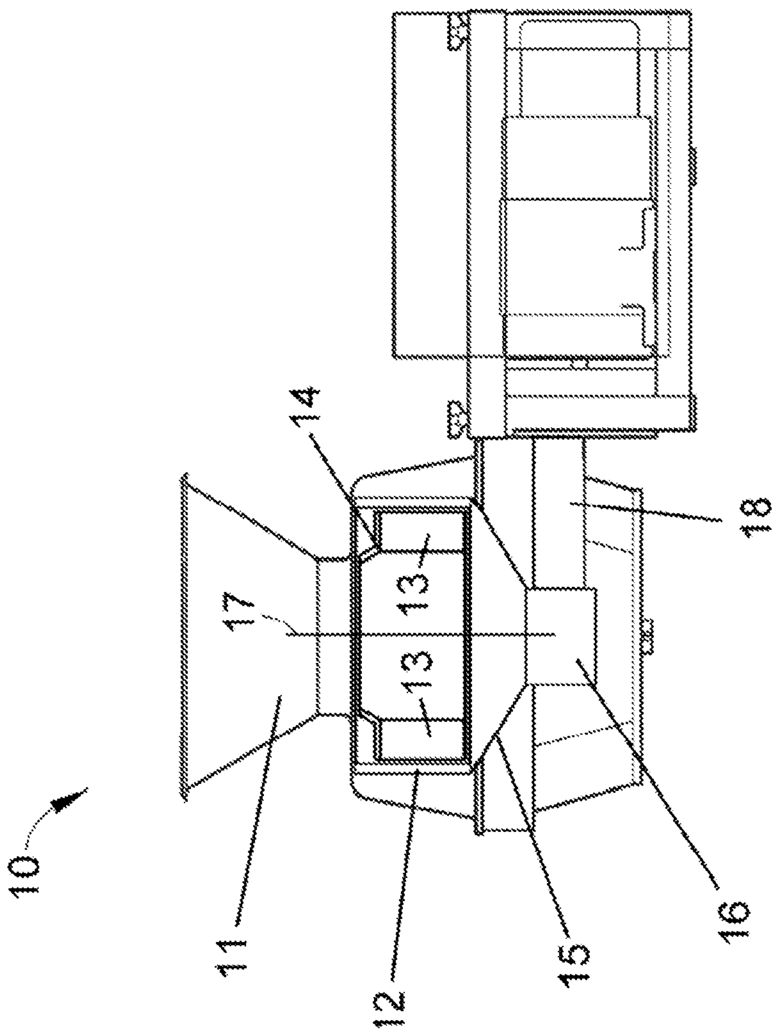
FIG. 1 Prior Art
FIG. 1 schematically represents a side view in partial cross-section of a centrifugal-type slicing machine known in the art.

The intended purpose of the following detailed description of the invention and the phraseology and terminology employed therein is to describe what is shown in the drawings, which include the depiction of one or more nonlimiting embodiments of the invention, and to describe certain but not all aspects of what is depicted in the drawings. The following detailed description also identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

Figure 2:
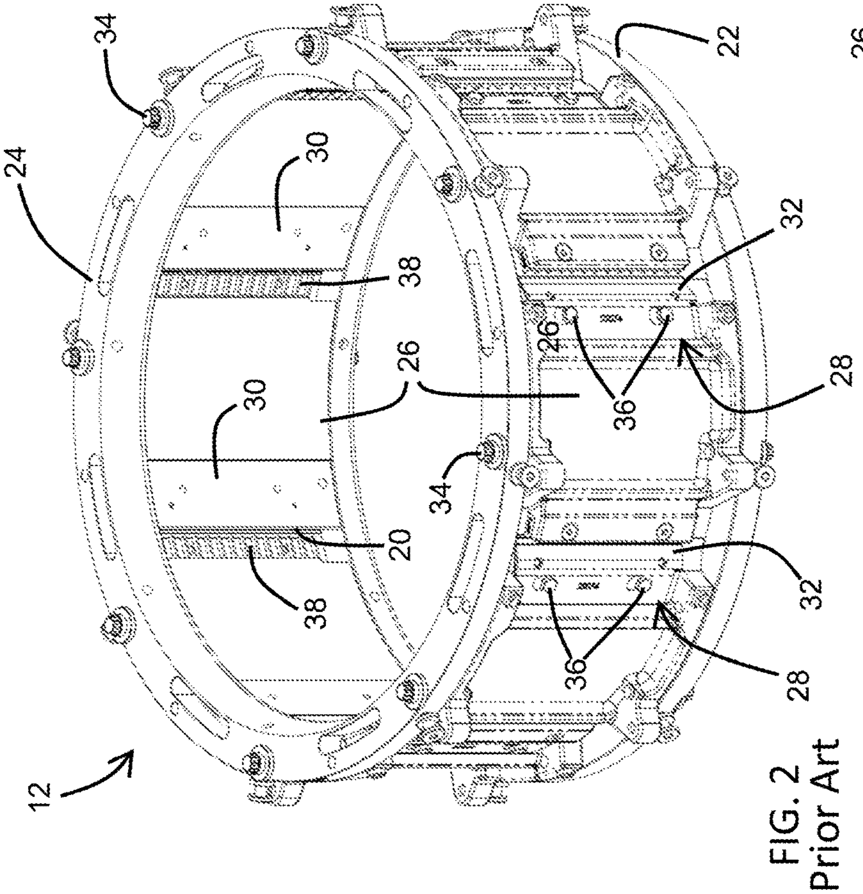
FIG. 2 Prior Art
FIGS. 2 and 3 are, respectively, perspective and fragmentary bottom views representing details of a cutting head that has found use in slicing machines of the type represented in FIG. 1.
Figure 3:
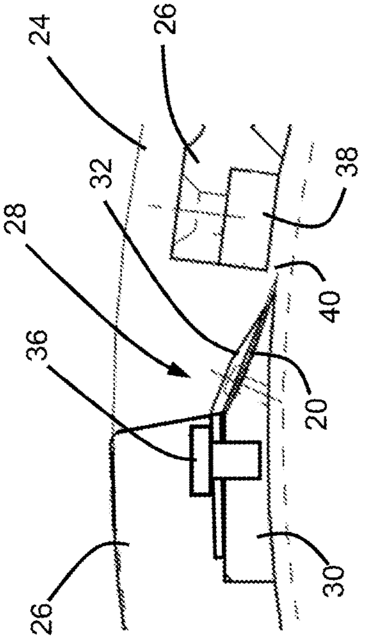
FIG. 3 Prior Art

FIGS. 5 through 29 schematically represent nonlimiting embodiments of clamping assemblies and FIGS. 30 through 49 schematically represent nonlimiting embodiments of knife replacement tools that are capable of use with a variety of cutting machines, including but not limited to the centrifugal-type slicing machine 10 depicted in FIG. 1 and the cutting head 12 depicted in FIGS. 2 and 3. In some instances, clamping assemblies disclosed herein may serve as replacements or modifications of clamping assemblies for machines and cutting heads of the type represented in FIGS. 1 through 3. As a matter of convenience, the clamping assemblies and tools will be illustrated and described hereinafter in reference to the slicing machine 10 of FIG. 1 equipped with an annular-shaped cutting head 12 as described in reference to FIGS. 2 and 3. As such, the following discussion will focus primarily on certain aspects of the clamping assemblies and tools that will be described in reference to certain aspects of the machine 10 and cutting head 12 represented in FIGS. 1 through 3, whereas other aspects of the machine 10 and cutting head 12 not discussed in any detail below may be essentially as was described in reference to FIGS. 1 through 3. However, it will be appreciated that the teachings of the invention are also generally applicable to other types of cutting machines. Moreover, though such machines and cutting heads are particularly well suited for slicing food products, it is within the scope of the invention that clamping assemblies and tools described herein could be utilized in machines and cutting heads adapted to cut a wide variety of other types of materials.

To facilitate the description provided below of the clamping assemblies and tools represented in the drawings, relative terms may be used in reference to the orientation of the clamping assemblies and tools relative to the cutting head 12 of FIG. 2, as represented by the cutting head 12 and impeller 14 of the machine 10 represented in FIG. 1. On the basis of the coaxial arrangement of the cutting head 12 and impeller 14 in FIG. 1, relative terms including but not limited to "axial," "circumferential," "radial," etc., and related forms thereof may also be used below to describe the nonlimiting embodiments represented in the drawings. All such relative terms are useful to describe the clamping assemblies and tools depicted in FIGS. 5 through 49, but should not be otherwise interpreted as limiting the scope of the invention. Furthermore, as used herein, "leading" (and related forms thereof) refers to a position or direction on the cutting head 12 that is ahead of or precedes another in the direction of rotation of the impeller 14 when assembled with and rotating within a cutting head 12, whereas "trailing" (and related forms thereof) refers to a position or direction on the cutting head 12 that follows or succeeds another relative to the direction of rotation of the impeller 14.

For convenience, consistent reference numbers are used throughout FIGS. 5 through 49 to identify the same or functionally related/equivalent elements of the various embodiments of clamping assemblies represented in the drawings.

Figure 5:
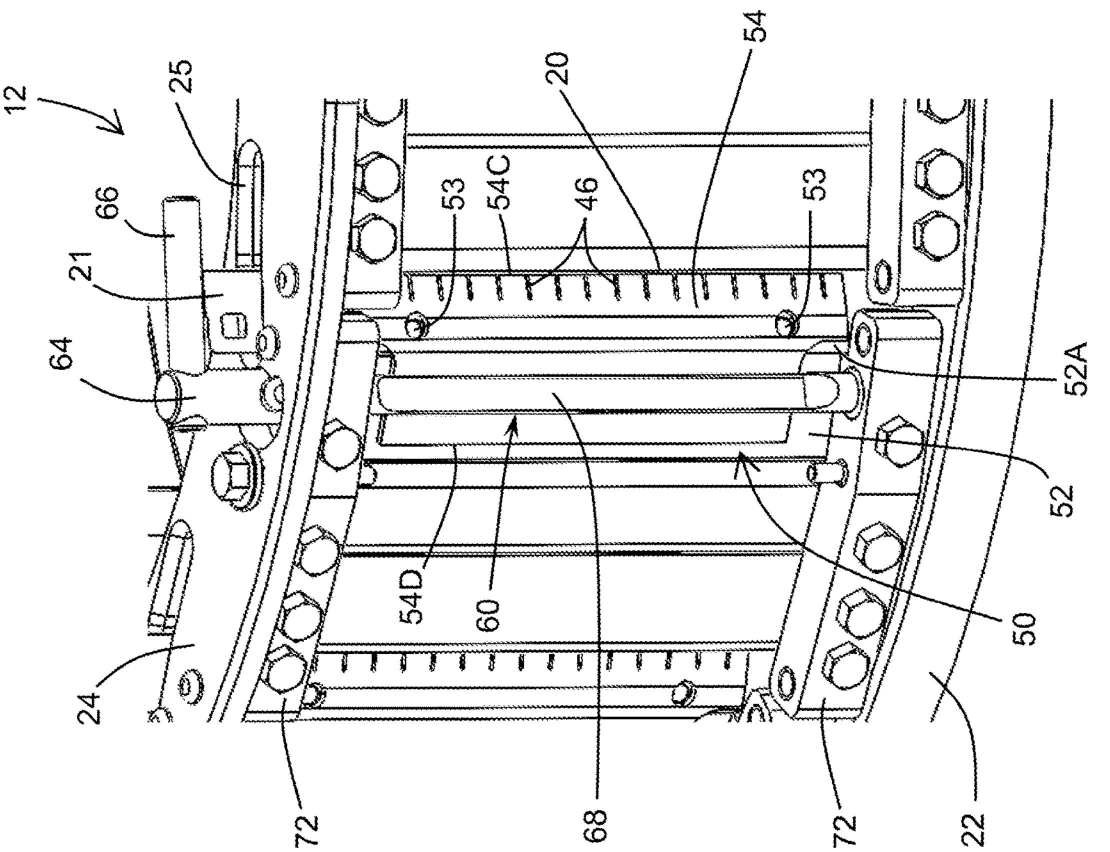
FIG. 5 is a fragmentary perspective view of a cutting head of a slicing machine, such as but not limited to the slicing machine of FIG. 1, and represents a clamping assembly installed on the cutting head and comprising a knife holder, a clamp, a handled strip-cut knife, and an eccentric cam rod, and shows the clamping assembly in a locked (clamping) position in which the eccentric cam rod clamps the knife between the knife holder and clamp.
Figure 6:
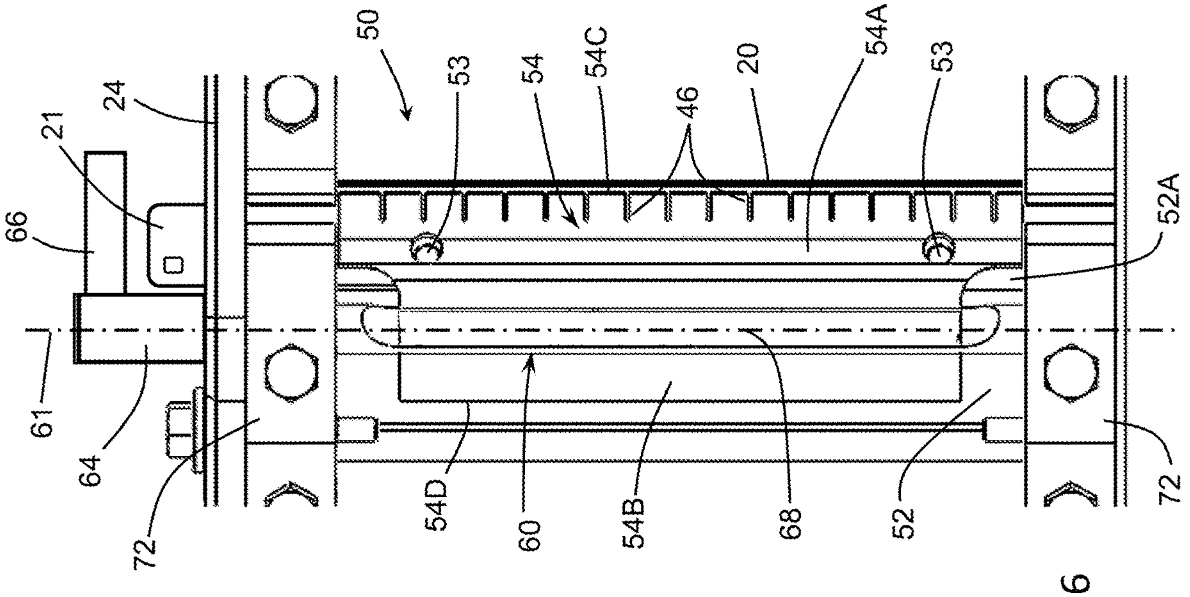
FIG. 6 is a fragmentary side view of the cutting head and clamping assembly of FIG. 5.

FIGS. 5 and 6 are, respectively, fragmentary perspective and side views of a first embodiment of a clamping assembly 50 mounted to a cutting head 12 of a slicing machine 10. The clamping assembly 50 is represented as comprising a knife holder 52 (partially hidden from view) and a clamp 54 securing a strip-cut knife 20 on a surface 52A of the knife holder 52. As a nonlimiting example, the knife 20 is represented in FIGS. 5 and 6 as a one-piece knife 20 with a handle 21 that protrudes through an opening 25 in the upper support ring 24, though it is also foreseeable that the knife 20 could be configured as a handleless knife, as a nonlimiting example, the handleless two-piece knife 20 of FIG. 4. One or more locating pins 53 are represented in FIG. 5 as protruding from the surface 52A of the knife holder 52, through complementary locating holes (e.g., 20C in FIG. 4) in the knife 20, and into complementary locating holes 54E (FIG. 7) in the clamp 54 to ensure proper alignment of the knife 20 and clamp 54 with the knife holder 52.

The clamping assembly 50 is further represented as mounted by and between a pair of bases 72 mounted to the support rings 22 and 24 of the cutting head 12. As perhaps more readily evident from the isolated view of the clamp 54 depicted in FIG. 7, the clamp 54 includes a knife-engaging portion 54A that forms a leading edge 54C of the clamp 54, physically contacts the knife 20, and therefore has a shape that is complementary to the knife 20 at least to the extent that the knife-engaging portion 54A has slots 56 (FIG. 7) that receive tab blades 46 of the knife 20. The clamp 54 further includes a base portion 54B adjacent a trailing edge 54D of the clamp 54 and configured to be engaged by means adapted to secure the clamp 54 to the knife holder 52 and apply a clamping load to the clamp 54. As evident from FIGS. 5 through 7, the base portion 54B has a width in a direction parallel to a longitudinal direction or length of the clamp 54 (generally parallel to the leading edge 54C of the clamp 54) that is less than the width of the knife-engaging portion 54A in a direction parallel to the longitudinal direction of the clamp 54.

In FIGS. 5 and 6, the securing/clamping means for the clamp 54 is represented as an eccentric cam rod 60 configured as a quick-clamping feature that applies a clamping force to the clamp 54. The cam rod 60 is represented in FIGS. 5 and 6 as rotatably mounted between the bases 72 of the cutting head 12 so as to be rotatable about a center longitudinal axis 61 of the cam rod 60 (FIGS. 6 and 7) that passes through the ends of the cam rod 60 that are received in the bases 72 (FIG. 6). FIGS. 5 and 6 further depict an upper end 64 of the rod 60 as protruding through the upper support ring 24. In the nonlimiting embodiment shown, counterclockwise rotation of the cam rod 60 about its axis 61 (as viewed from above in FIGS. 5, 6, and 7) using a handle 66 of the rod 60 causes the cam rod 60 to eccentrically move into engagement with the base portion 54B of the clamp 54, forcing the clamp 54 into engagement with the knife 20 and thereby clamping the knife 20 to the knife holder 52. This position, depicted in FIGS. 5 and 6, is referred to herein as a locked or clamping position. The force applied to the clamp 54 by the cam rod 60 can be released by rotating the cam rod 60 counterclockwise about its axis 61. Once the cam rod 60 is rotated to an unlocked or open position at which the clamping force is sufficiently reduced to release the knife 20. Such an open position, referred to herein as a knife release position, is sufficient to enable the knife 20 to be removed from the cutting head 12 by grasping the handle 21 of the knife 20 and withdrawing the knife 20 upward through the opening 25 in the upper support ring 24.

Figure 7:
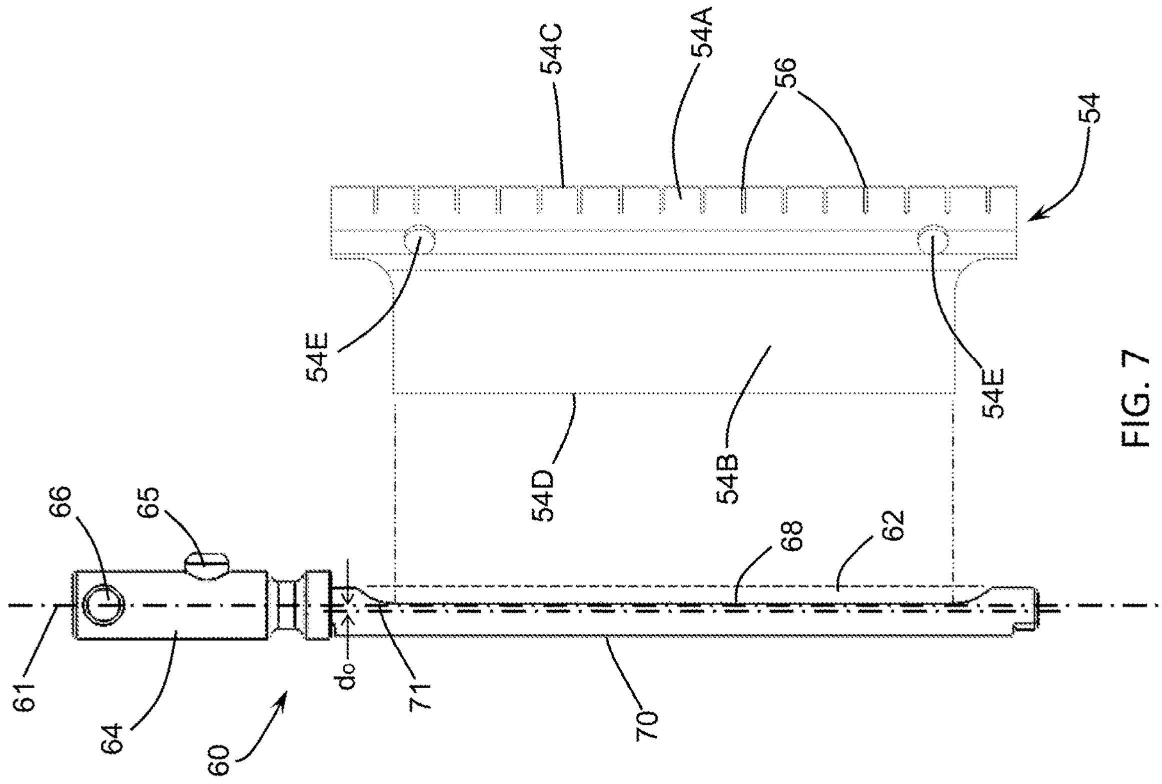
FIG. 7 shows isolated views of the eccentric cam rod and clamp of the clamping assembly.

As more readily seen in FIG. 7, the cam rod 60 defines a camming surface 70 that, when the cam rod 60 is rotated to the position shown in FIGS. 5 and 6, engages the base portion 54B of the clamp 54 to force the clamp 54 into engagement with the knife 20 and clamp the knife 20 (through the clamp 54) against the knife holder 52. To promote the application of a uniform clamping load to the clamp 54, the base portion 54 of the clamp 54 is represented as centrally located along the longitudinal length of the clamp 54. In FIG. 7, the eccentricity of the cam rod 60 is seen as a center longitudinal axis 71 of the portion of the cam rod 60 containing the camming surface 70 being diametrically offset a distance $d_o$ from the center longitudinal axis 61 of the cam rod 60, to which the axis 71 is also represented as being parallel. As further represented in FIGS. 5, 6, and 7, the cam rod 60 has a radial concavity 62 (FIG. 7) that defines a recessed surface 68 spanning a portion (as shown, a majority) of the longitudinal length of the rod 60 between the bases 72. The recessed surface 68 is also represented as roughly parallel to the axes 61 and 71, and the radial concavity 62 is sized to accommodate the base portion 54B of the clamp 54, whose width is also parallel to the cam rod 60 and less than the longitudinal length of the cavity 62 such that, when assembled as shown in FIGS. 5 and 6, the base portion 54B of the clamp 54 is able to be loosely received within the radial concavity 62 when the cam rod 60 is rotated about its axis 61 so that the radial concavity 62 faces the clamp 54. As portrayed in FIGS. 5 and 6, the radial concavity 62 and recessed surface 68 of the cam rod 60 face away from the clamp 54 when the cam rod 60 has been rotated about its axis 61 so that the camming surface 70 engages the clamp 54.

Figure 8A:
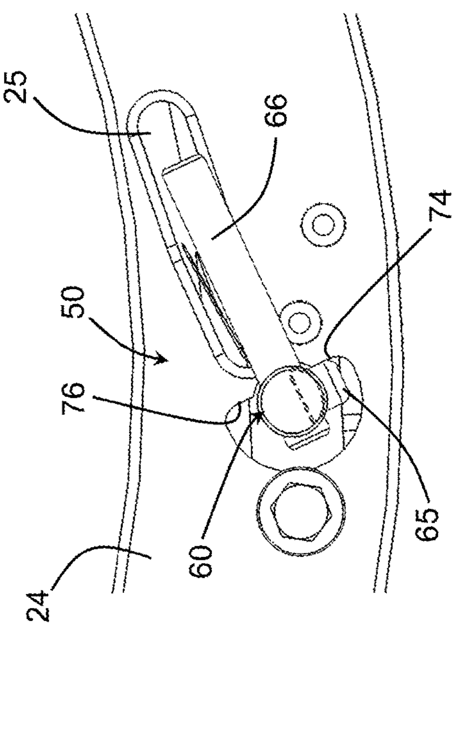
FIGS. 8A and 8B schematically represent fragmentary top and cross-sectional views, respectively, of the cutting head of FIG. 5 showing the eccentric cam rod in the locked (clamping) position.
Figure 8B:
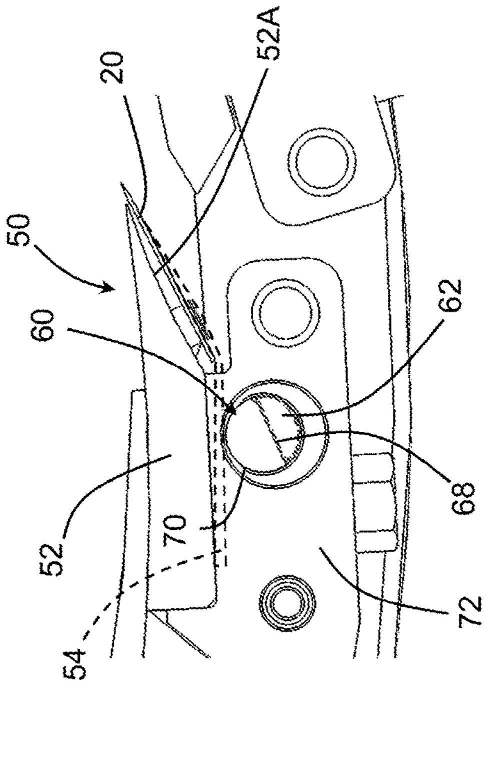
Figure 9A:
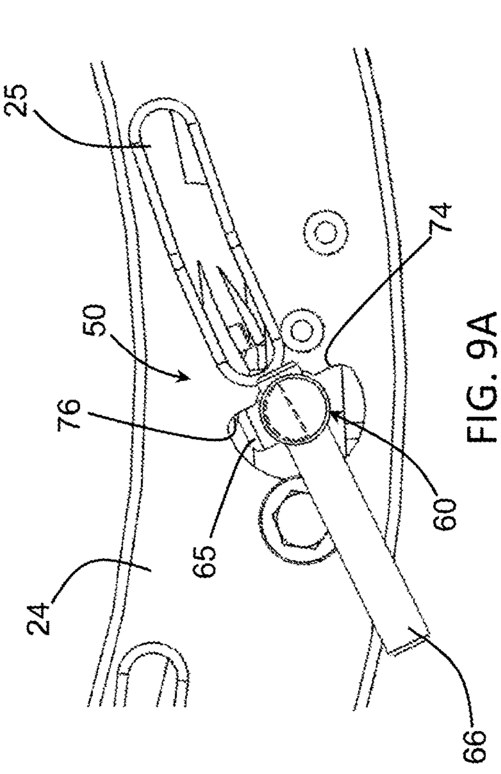
FIGS. 9A and 9B schematically represent fragmentary top and cross-sectional views, respectively, of the cutting head of FIG. 5 showing the eccentric cam rod in a knife release position suitable for removing the knife.
Figure 9B:
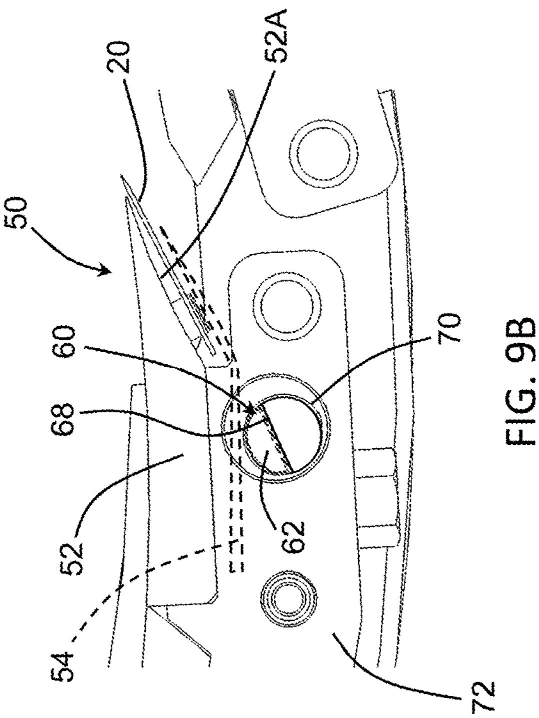

FIGS. 8A, 8B, 9A, 9B, and 10 represent two rotational positions of the cam rod 60 that effectuate the engaging (clamping) and disengaging (releasing) the clamp 54. FIGS. 8A and 8B depict the aforementioned locked position in which, as seen in FIG. 8B, the camming surface 70 is oriented to face and engage the clamp 54 (shown in phantom) to clamp the knife 20 against the knife holder 52, while the radial concavity 62 and recessed surface 68 of the cam rod 60 face away from the clamp 54. In the locked position, a stop pin 65 protruding from the cam rod 60 bears against a "locked" stop 74 on the upper support ring 24, and the handle 66 of the cam rod 60 is disposed directly above the opening 25 in the upper support ring 24, obstructing access to the handle 21 (not shown) of the knife 20. In FIG. 9A, the cam rod 60 has been rotated to the aforementioned knife release (open) position in which, as seen in FIG. 9B, the radial concavity 62 and recessed surface 68 of the cam rod 60 are oriented to largely face the clamp 54 (shown in phantom), whereas the camming surface 70 largely faces away from the clamp 54. The eccentricity of the cam rod 60 (evidenced by the cam rod 60 being shifted away from the clamp 54 relative to its position shown in FIG. 8B) and the location of its concavity 62 and recessed 68 combine to release the knife 20 from the knife holder 52. In the knife release position, the stop pin 65 protruding from the cam rod 60 bears against a "knife release" stop 76 on the upper support ring 24, shown in FIGS. 8A and 9A as located approximately 180 degrees clockwise from the locked stop 74. Additionally, the handle 66 of the cam rod 60 is no longer disposed directly above the opening 25 in the upper support ring 24, facilitating access to the handle 21 of the knife 20 so that the knife 20 can be removed from the cutting head 12 by grasping the handle 21 of the knife 20 and withdrawing the knife 20 upward through the opening 25 in the upper support ring 24.

Figure 11:
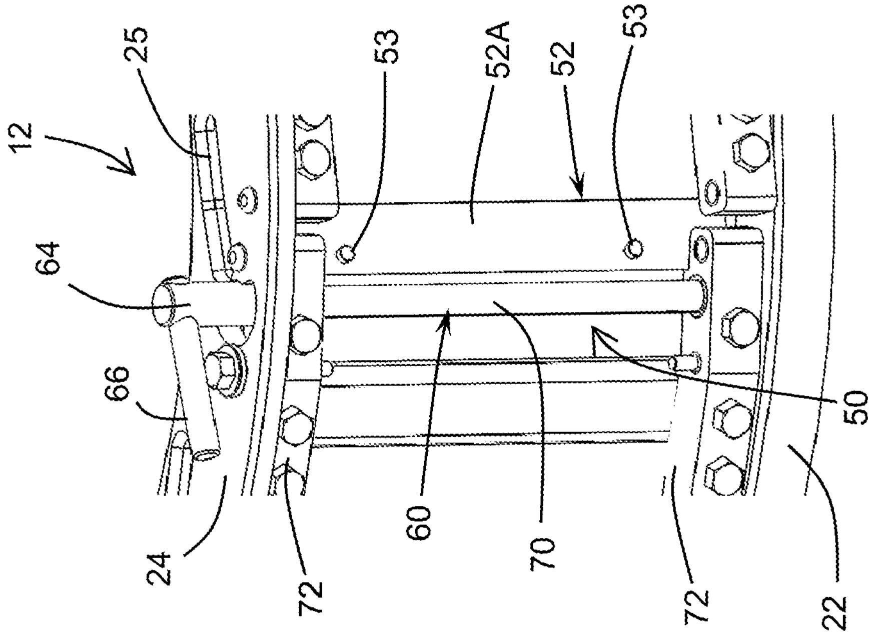
FIGS. 10 and 11 are fragmentary perspective views of the cutting head of FIG. 5 (knife omitted) and showing, respectively, the removal of the clamp from the clamping assembly after the eccentric cam rod is rotated to the knife release position of FIGS. 9A and 9B, and the cutting head after the removal of the clamp.
Figure 10:
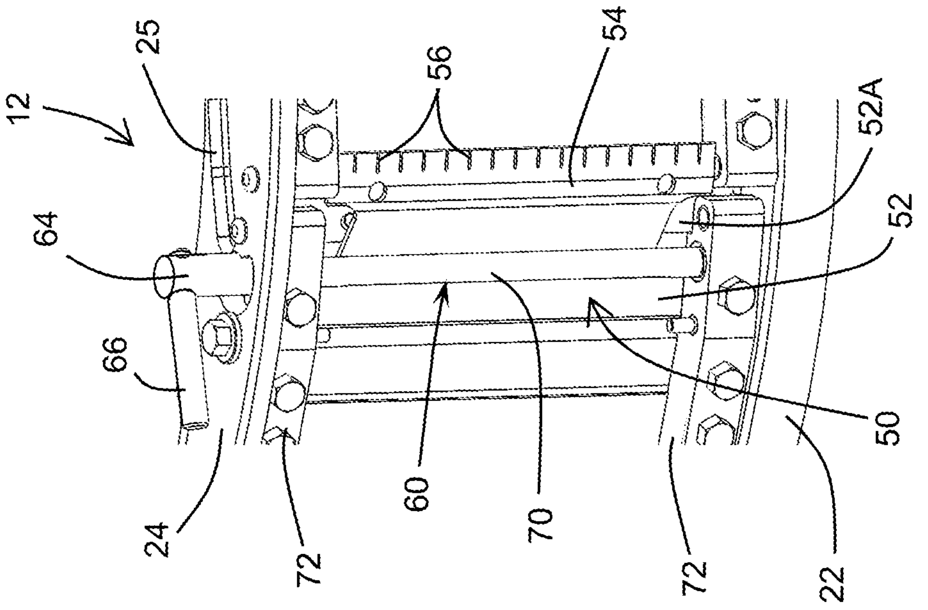

FIGS. 10 and 11 depict perspective views of the cutting head 12 of FIGS. 5, 6, and 8A through 9B, and represent the cam rod 60 in the knife release position and the clamp 54 partially removed and completely removed, respectively, from the clamping assembly 50. In FIG. 11, a knife 20 previously secured by the clamp 54 has also been removed to expose the knife holder 52 and its knife support surface 52A.

Figure 4:
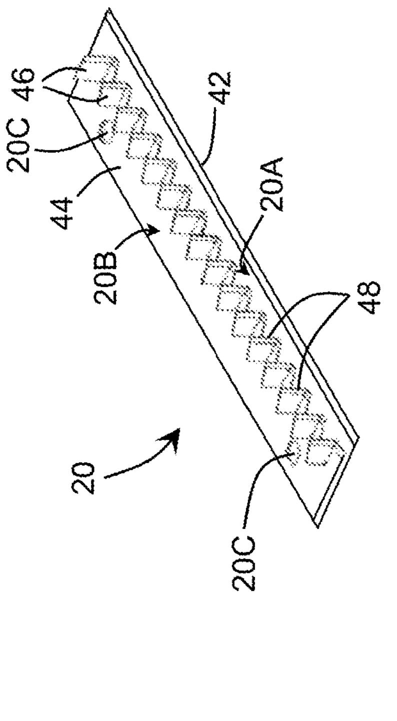
FIG. 4 Prior Art
FIG. 4 schematically represents a perspective view of a handleless strip-cut knife known in the art and capable of use in slicing machines of the type represented in FIGS. 1 and 2.
Figure 13:
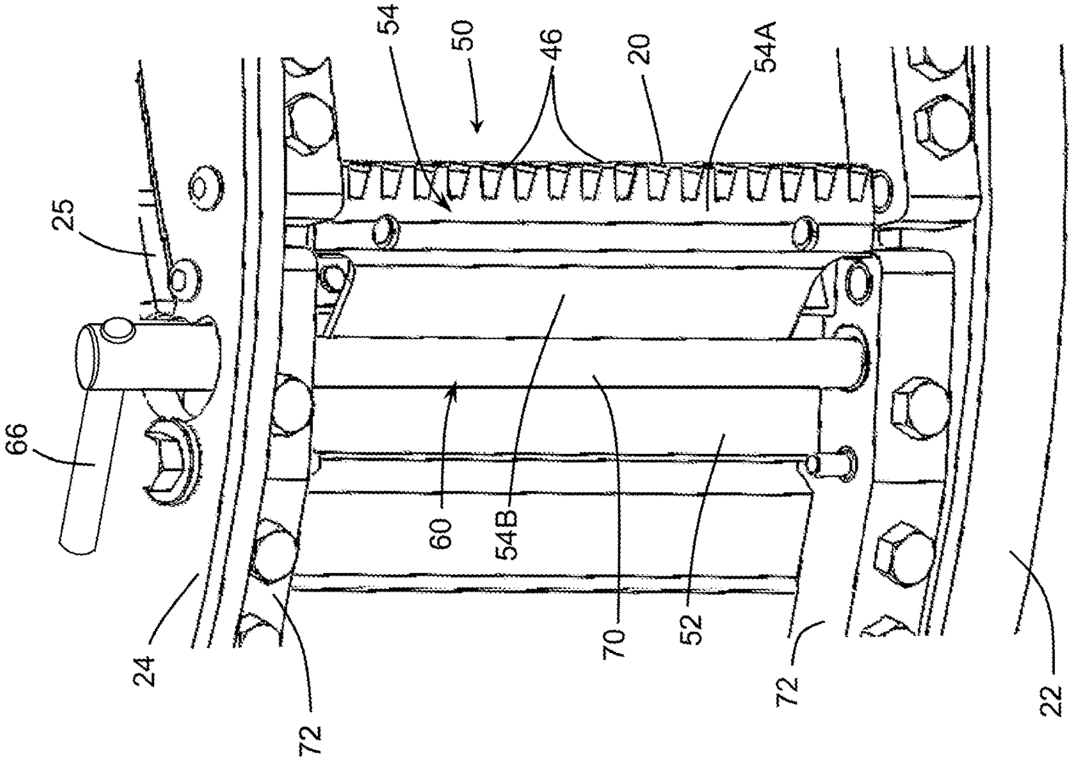
FIGS. 12 and 13 are each fragmentary perspective views of the cutting head of FIG. 5 showing the eccentric cam rod rotated past the knife release position to a fully open position, and a handleless strip-cut knife (such as shown in FIG. 4) installed on the cutting head before the clamp is installed (FIG. 12) and being simultaneously installed on the cutting head with the clamp (FIG. 13).
Figure 12:
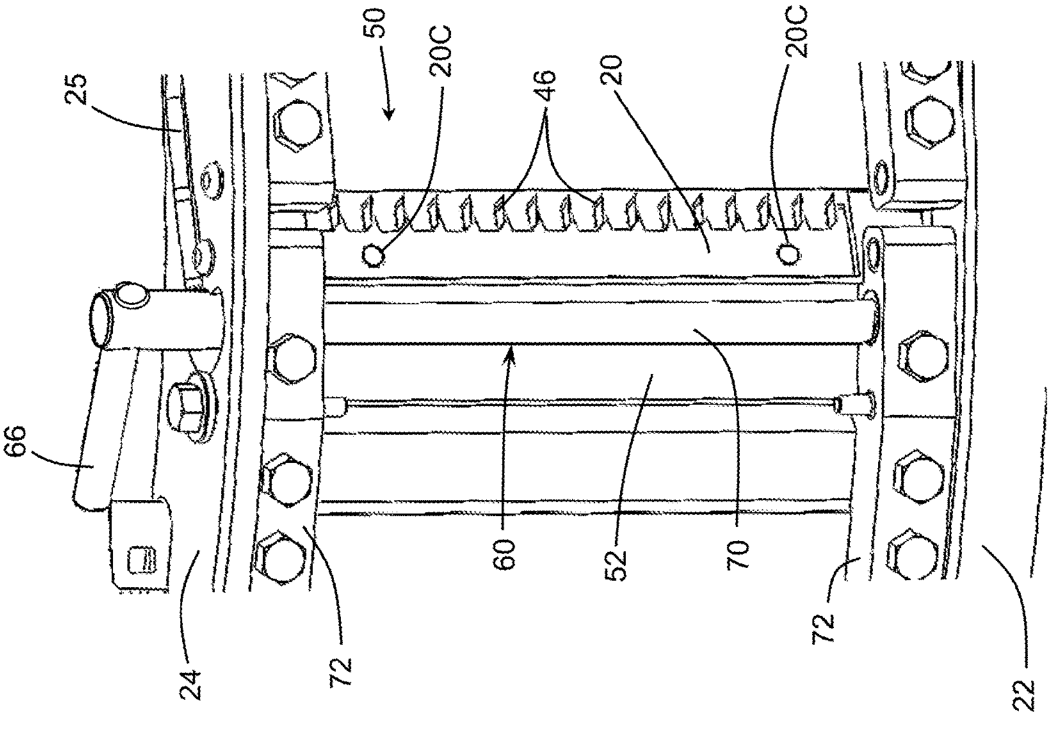
Figure 15:
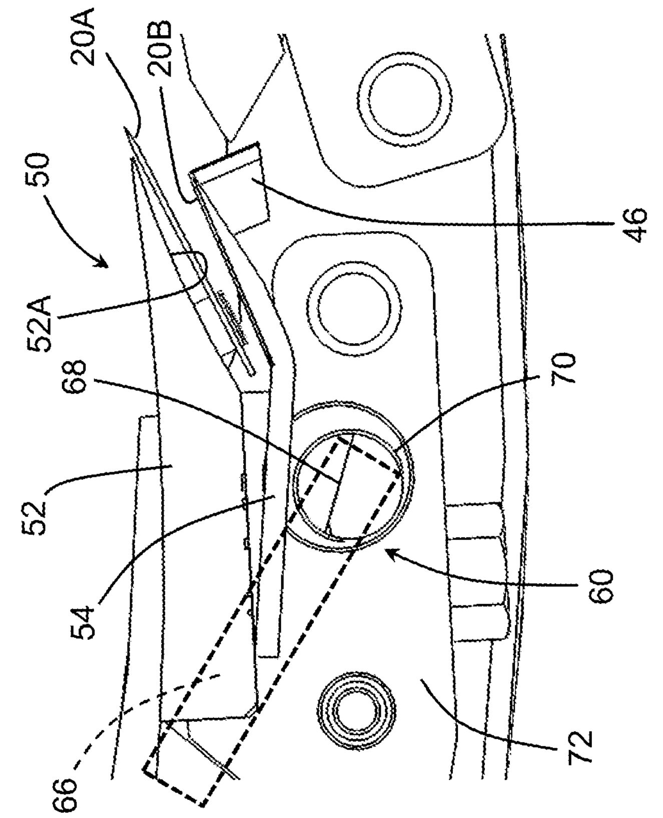
FIGS. 14 and 15 are each fragmentary cross-sectional views of the cutting head of FIG. 5 with the eccentric cam rod rotated past the knife release position to the fully open position shown in FIGS. 12 and 13, and progressively showing the simultaneous installation of the clamp and a handleless strip-cut knife (such as shown in FIG. 4).
Figure 14:
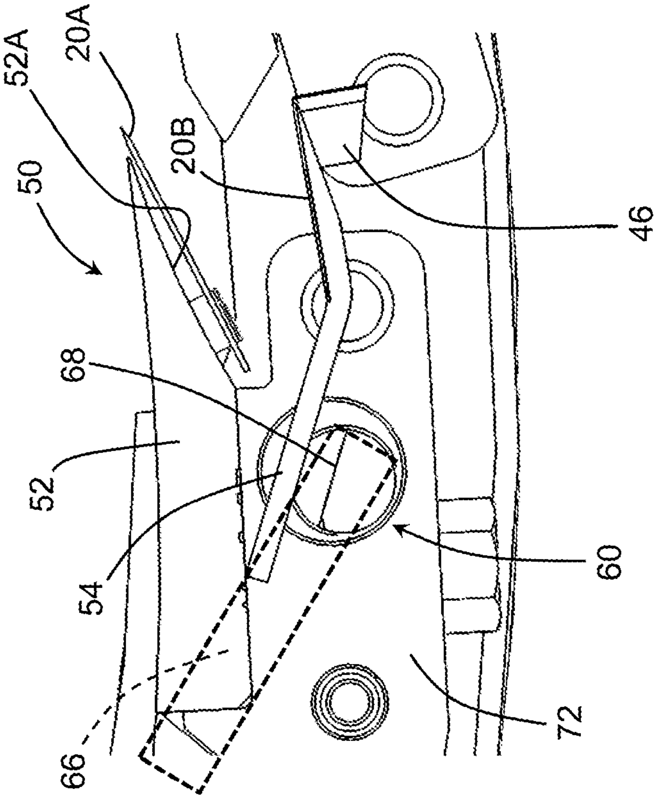

FIGS. 12 and 13 depict perspective views of the cutting head 12 of FIGS. 5, 6, and 8A through 11, and represent the cam rod 60 as having been raised so that the stop pin 65 (not visible) protruding from the cam rod 60 clears the knife release stop 76 on the upper support ring 24, enabling the rod 60 to be rotated past the knife release position represented in FIGS. 9A, 9B, 10, and 11 to a fully open position. FIG. 12 depicts the ability to install a strip-cut knife 20 (with or without a handle 21) prior to installing the clamp 54 on the cutting head 12, and FIG. 13 depicts the ability to preassemble the clamp 54 with a strip-cut knife 20 that lacks a handle (for example, as shown in FIG. 4) and then install the resulting clamp-knife assembly on the cutting head 12. FIGS. 14 and 15 progressively show the simultaneous installation of the clamp 54 and knife 20 while the cam rod 60 is in the fully open position of FIGS. 12 and 13.

Figure 16:
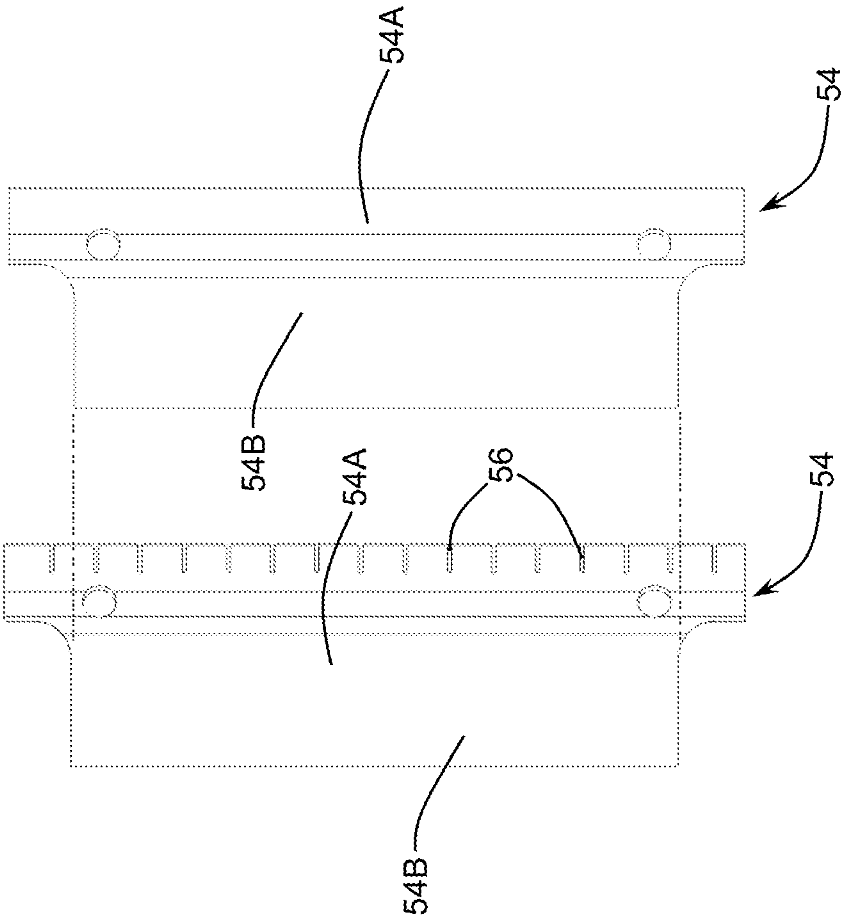
FIG. 16 schematically represents the clamp of FIGS. 5 through 15 side-by-side with a second clamp that is configured to be used to secure a flat knife that is not a strip-cut knife.
Figure 18:
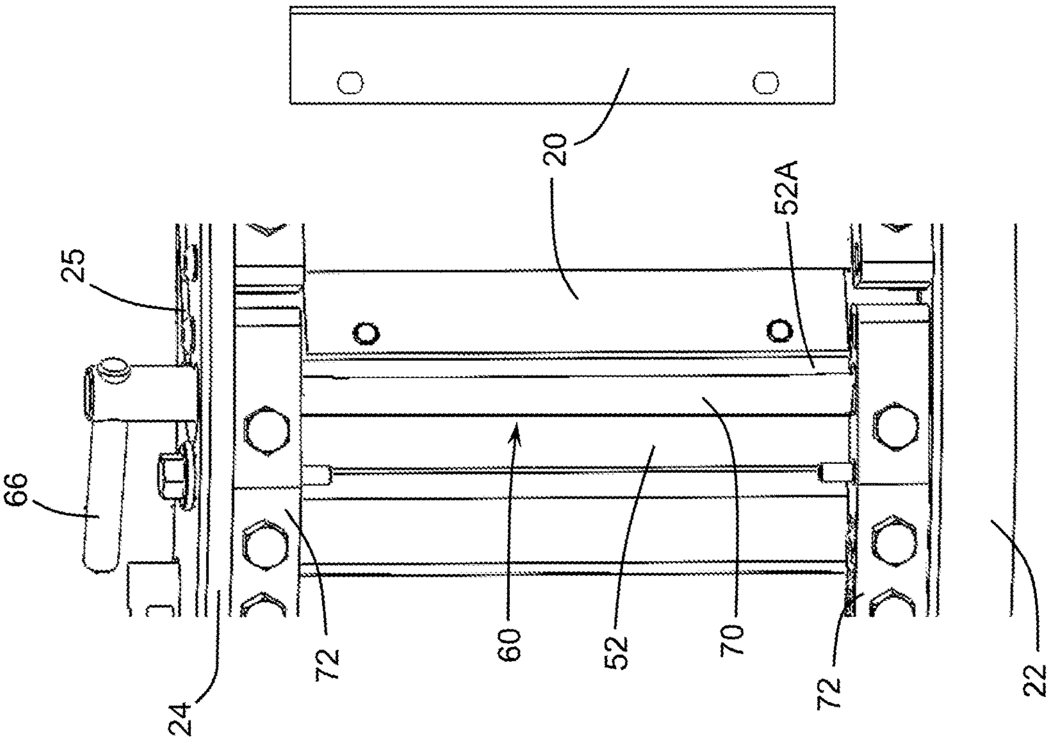
FIGS. 17 and 18 are each fragmentary perspective views of the cutting head of FIG. 5 showing that knives other than a strip-cut knife (such as shown in FIGS. 4 and 5) can be installed on the cutting head.
Figure 17:
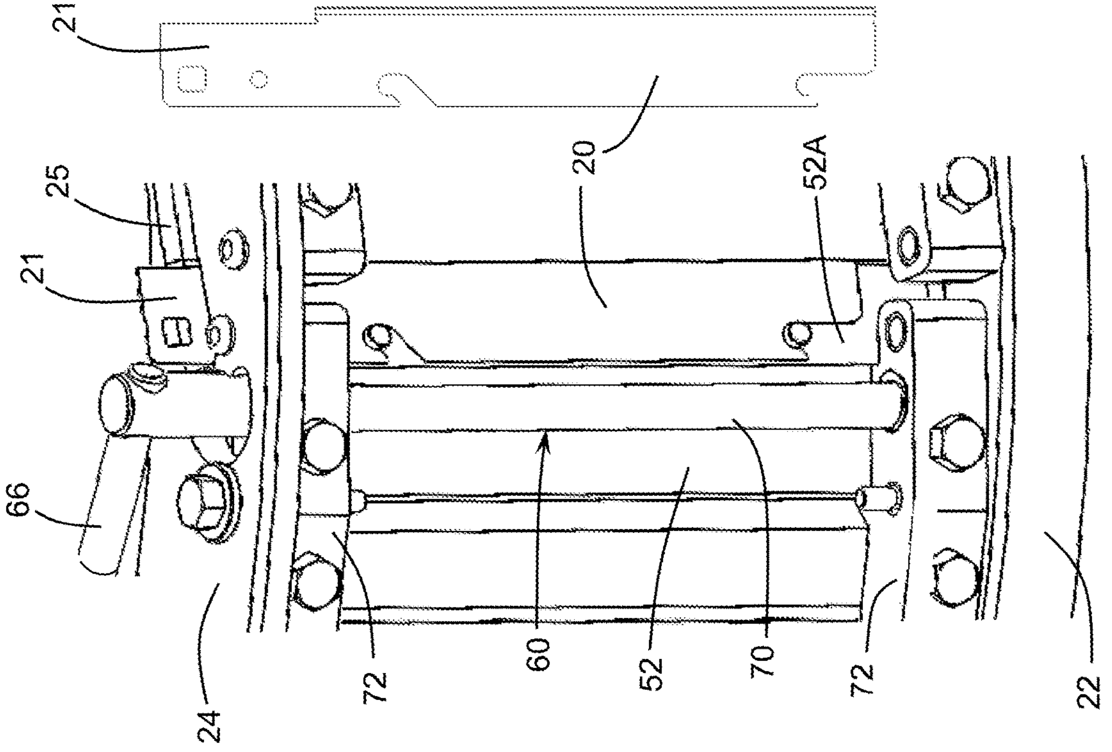

FIG. 16 schematically represents the clamp 54 of FIGS. 5 through 15 side-by-side with a second clamp 54 that is configured to be used to secure a flat knife that is not a strip-cut knife. From FIG. 16, it can be seen that the second clamp 54 may differ from the clamp 54 of FIGS. 5 through 15 simply by the elimination of the slots 56 in the knife-engaging portion 54A that would receive the tab blades 46 of a strip-cut knife 20. FIGS. 17 and 18 are each fragmentary perspective views of the cutting head of FIG. 5 and depict nonlimiting examples of handled and handleless flat knives 20, respectively, that can be installed on the cutting head 12, for example, in combination with the second clamp 54 of FIG. 16.

FIGS. 19 through 29 represent the cutting head 12 of FIG. 5 adapted for use with an eccentric cam rod 60 that differs from the rod 60 of FIGS. 5 through 18. The cam rod 60 of FIGS. 19 through 29 is also configured as a quick-clamping feature of a clamping assembly 50 to apply a clamping force to a clamp 54. In view of similarities between the cam rods 60 of FIGS. 5 through 18 and FIGS. 19 through 29, the following discussion will be directed to the cam rod 60 of FIGS. 19 through 29 and focus primarily on aspects of the cam rod 60 of FIGS. 19 through 29 that differ from the cam rod 60 of FIGS. 5 through 18 in some notable or significant manner. Other aspects of the embodiments represented in FIGS. 19 through 29 that are not discussed in any detail may be, in terms of structure, function, materials, etc., essentially as was described for the embodiments of FIGS. 5 through 18.

Figure 20:
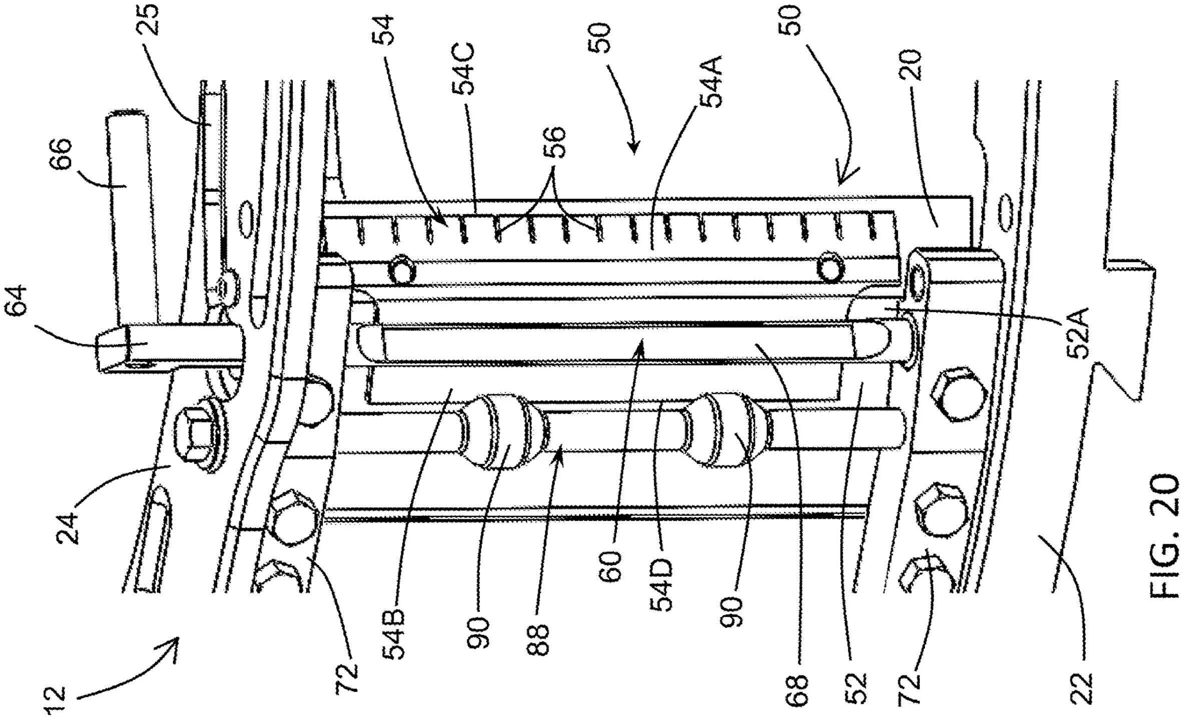
FIG. 20 is a fragmentary perspective view of a cutting head of a slicing machine, such as but not limited to the slicing machine of FIG. 1, and shows a clamping assembly comprising the eccentric cam rod of FIG. 19, wherein the clamping assembly is in a locked (clamping) position in which the eccentric cam rod clamps a knife between a knife holder and a clamp.
Figure 21:
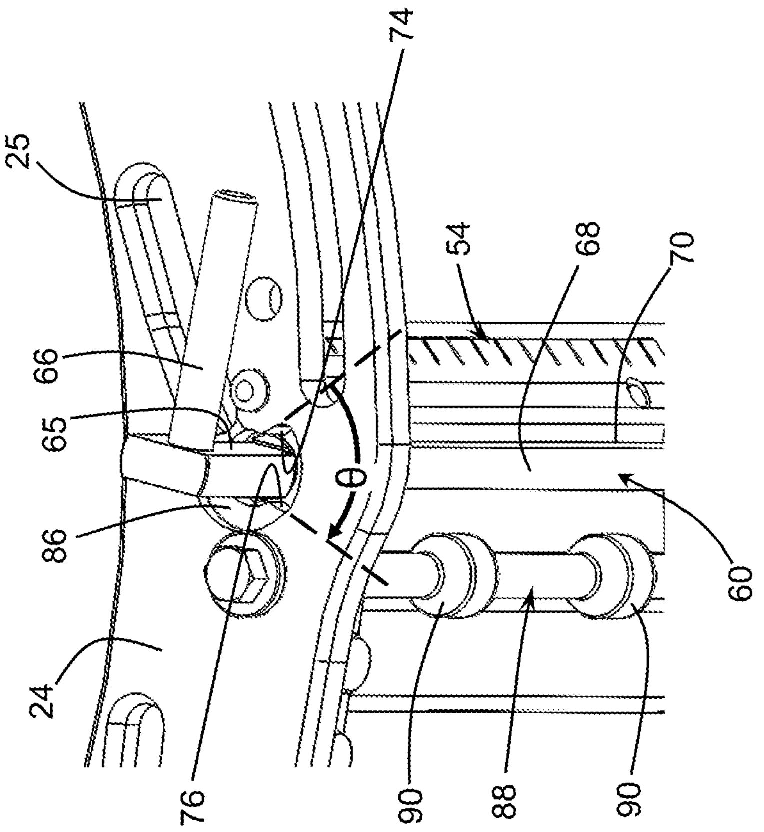
FIG. 21 is a fragmentary perspective view of the cutting head of FIG. 20 and shows the eccentric cam rod in a knife release position suitable for removing the knife.

The cam rod 60 is represented in FIGS. 19 through 29 as rotatably mounted about its axis 61 between the bases 72, and an upper end 64 of the rod 60 protrudes through the upper support ring 24. FIG. 20 depicts a locked (or clamping) position of the cam rod 60. In the nonlimiting embodiment shown, counterclockwise rotation of the cam rod 60 about its axis 61 (as viewed from above in FIG. 20) using the handle 66 of the rod 60 causes the camming surface 70 of the cam rod 60 to eccentrically move into engagement with the base portion 54B of the clamp 54, forcing the clamp 54 into engagement with a knife 20 (not shown in FIG. 20) and thereby clamping the knife 20 to the knife holder 52. The force applied to the clamp 54 by the cam rod 60 can be released by rotating the cam rod 60 counterclockwise about its axis 61. FIG. 21 represents the cam rod 60 as having been rotated clockwise from the locked (clamping) position of FIG. 20 to the knife release (open) position, at which the clamping force is sufficiently reduced to release the knife 20 to enable its removal from the cutting head 12.

In FIGS. 19 through 29, the stop pin 65 of FIGS. 5 through 18 has been replaced by a stop flange 65, which in the nonlimiting illustrated embodiment is a radially-projecting planar surface of the upper end 64 of the rod 60. The stop flange 65 sufficiently protrudes from the cam rod 60 to be capable of bearing against a locked stop 74 (FIG. 21) on the upper support ring 24 when the rod 60 is in the locked (clamping) position shown FIG. 20. In this position, the handle 66 of the cam rod 60 is disposed directly above the opening 25 in the upper support ring 24. In FIG. 21, the cam rod 60 has been rotated about its axis 61 to the aforementioned knife release (open) position in which, as seen in FIG. 21, the camming surface 70 still largely faces the clamp 54, but the eccentricity of the cam rod 60 sufficiently disengages the camming surface 70 from the clamp 54 to release the knife 20 from the knife holder 52. In the knife release position, the stop flange 65 of the cam rod 60 bears against a knife release stop 76 on the upper support ring 24, which as represented in FIG. 21 is located an angle 0 of less than 90 degrees clockwise from the locked stop 74. In the knife release position, the handle 66 of the cam rod 60 is no longer disposed directly above the opening 25 in the upper support ring 24.

Figure 19:
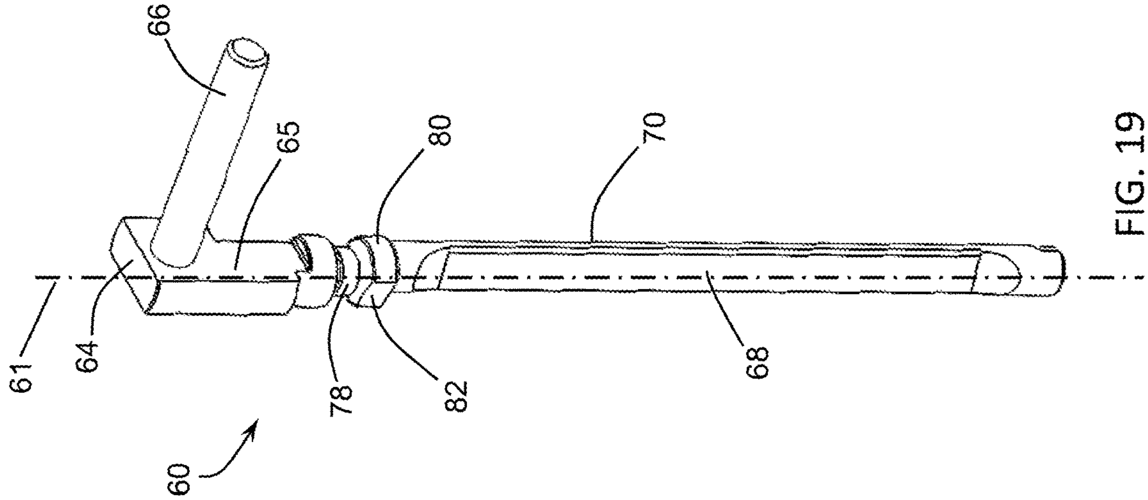
FIG. 19 is an isolated view of an alternative eccentric cam rod.

The cam rod 60 of FIGS. 19 through 29 further has an annular slot 78 and an annular collar 80 that are located between the upper end 64 and recessed surface 68 of the rod 60. The collar 80 has a recessed surface 82, generally lying on a chord of the collar 80. The recessed surface 82 is represented in FIG. 19 as circumferentially offset from the recessed surface 68 of the rod 60 in a clockwise direction of the cam rod 60 (as viewed from above in FIG. 19). As evident from FIGS. 22 and 23, the slot 78 cooperates with a retaining element 84 to retain the cam rod 60 in an axial position with respect to the base 72 adjacent the upper support ring 24. In this axial position, the cam rod 60 is rotatably received in each of the bases 72, as seen in FIG. 20.

Figure 23:
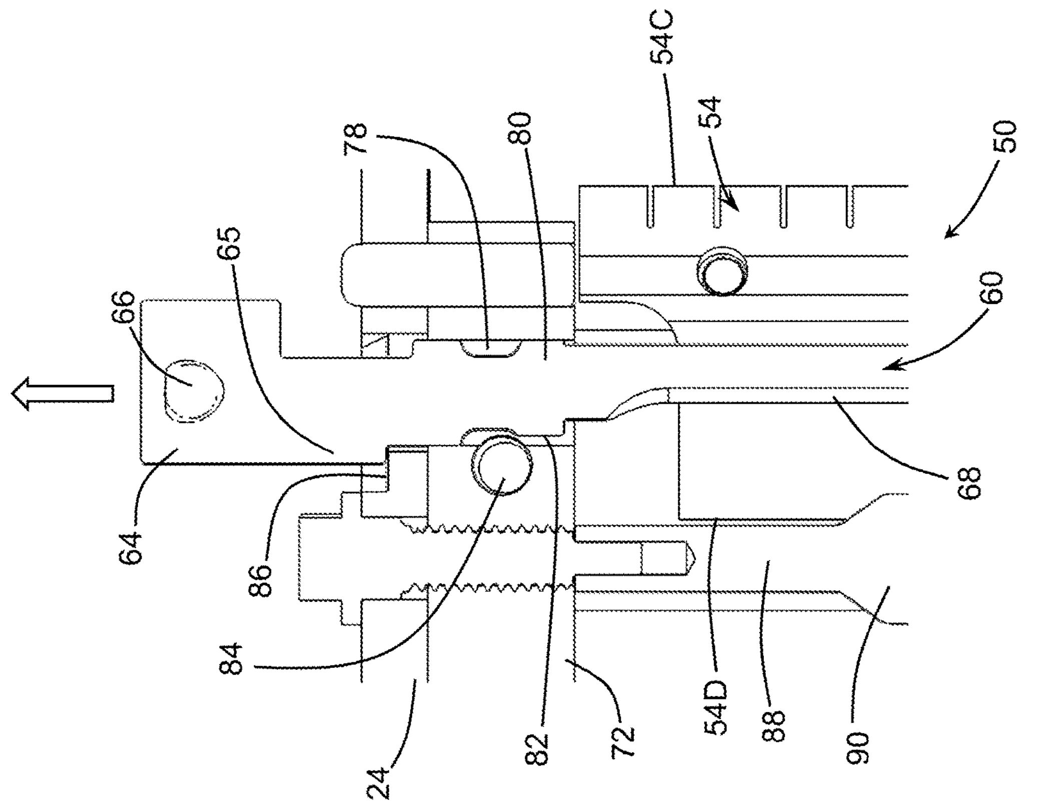
FIGS. 22 and 23 are fragmentary cross-sectional views of the cutting head and clamping assembly of FIGS. 20 and 21, showing the eccentric cam rod in the locked (clamping) position and a cam release position, respectively.
Figure 22:
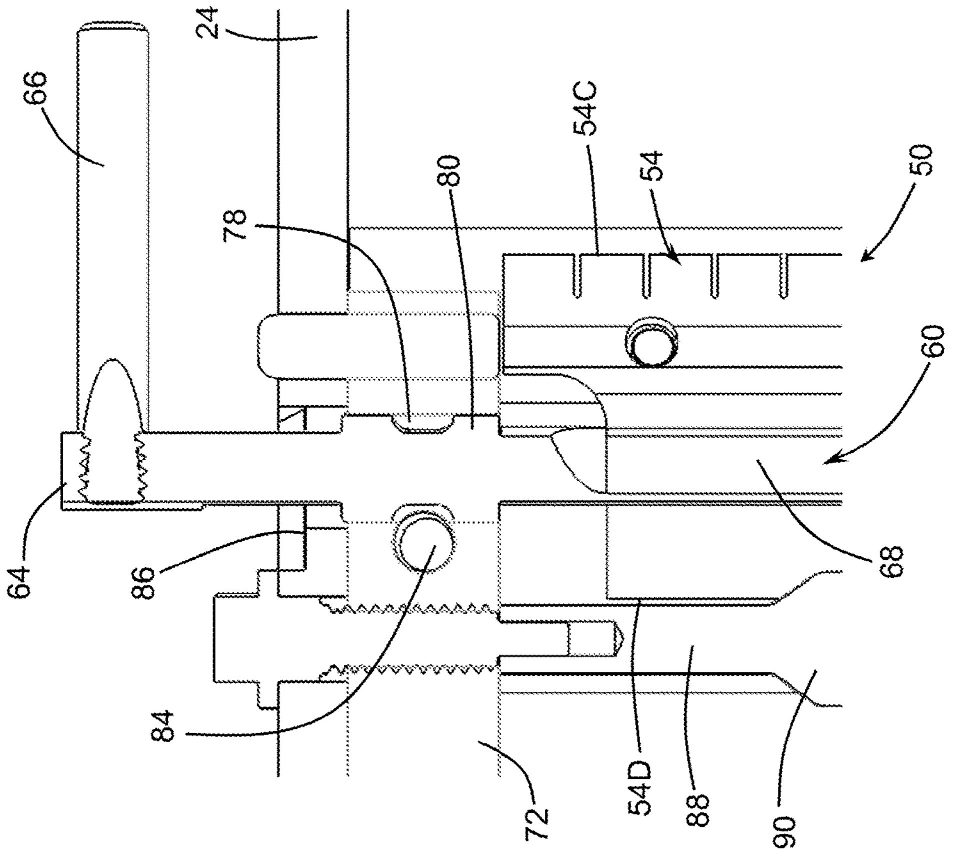

As shown in FIGS. 21 through 23, the locked and knife release stops 74 and 76 are located within a recess in the upper surface of the upper support ring 24. A raised step 86 is located within this recess in a clockwise direction from the knife release stop 76. The axial length of the slot 78 is sufficient to allow the cam rod 60 to be raised (arrow in FIG. 23) while remaining engaged with the retaining element 84 so that the stop flange 65 clears the step 86, permitting the cam rod 60 to be rotated clockwise about its axis 61 beyond the knife release stop 76. In the nonlimiting embodiment of FIG. 23, the cam rod 60 has been rotated beyond the knife release position depicted in FIG. 21 to a second open position about 90 degrees clockwise from the locked position depicted in FIGS. 20 and 22, so that the stop flange 65 has cleared and rests on the step 86. In the position shown in FIG. 23, the recessed surface 82 of the collar 80 is aligned with the retaining element 84, enabling the collar 80 to clear the retaining element 84 and allow the cam rod 60 to be raised farther in the direction of the arrow in FIG. 23, and if so desired the cam rod 60 may be completely removed from the cutting head 12. As such, the open position shown in FIG. 23 may be referred to as a "cam release" position of the cam rod 60.

Figure 24:
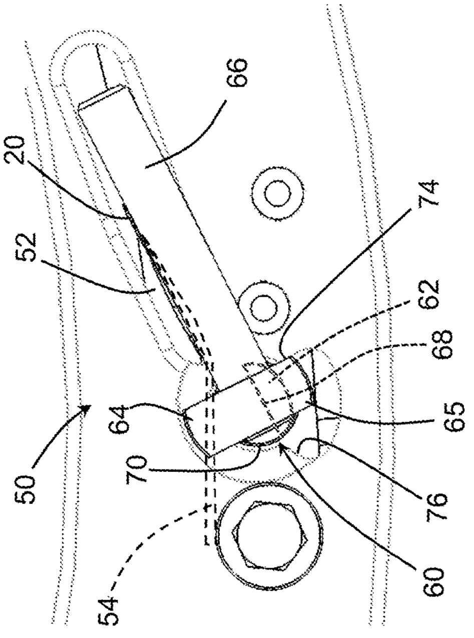
FIGS. 24 through 26 schematically represent fragmentary top views of the cutting head of FIGS. 20 through 23 showing the eccentric cam rod in, respectively, the locked (clamping) position, the knife release position suitable for releasing the knife from the clamping assembly without removing the clamp, and a clamp release position suitable for removing the clamp and/or knife or cleaning the clamping assembly.
Figure 25:
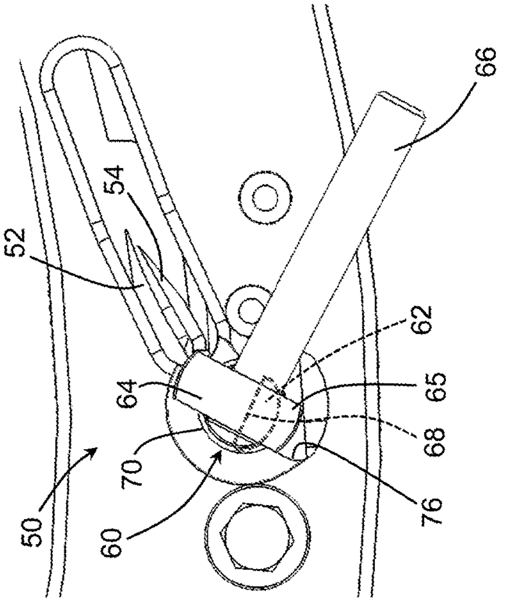
Figure 26:
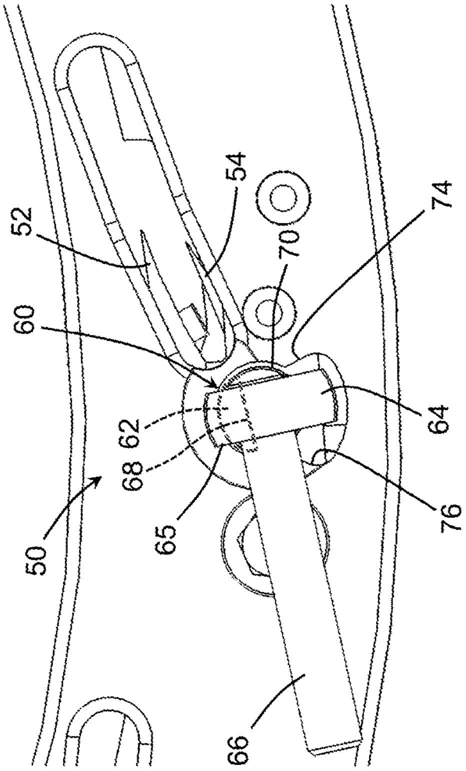

FIGS. 24 and 25 schematically represent top views of a portion of the cutting head 12 and illustrate, respectively, the cam rod 60 in the locked (clamping) position (corresponding to FIGS. 20 and 22) and the knife release (open) position (corresponding to FIG. 21). As evident from FIGS. 24 and 25, which shows an outline of the radial concavity 62 of the cam rod 60 in phantom, the camming surface 70 largely faces the clamp 54 in both the locked and knife release positions, but in the knife release position of FIG. 25 the eccentricity of the cam rod 60 sufficiently disengages the camming surface 70 from the clamp 54 to release the knife 20 from the knife holder 52. In FIG. 26, the cam rod 60 has been rotated about its axis 61 beyond the knife release position depicted in FIGS. 21 and 25 as well as beyond the cam release position depicted in FIG. 23, to a third open position roughly opposite (about 180 degrees clockwise from) the locked position depicted in FIGS. 20 and 22. As evident from FIG. 26, the radial concavity 62 and recessed surface 68 of the cam rod 60 now face the clamp 54, providing sufficient clearance therebetween to allow the clamp 54 to be removed from the clamping assembly 50. As such, the open position shown in FIG. 26 may be referred to as a "clamp removal" position of the cam rod 60. The clamp removal position also facilitates cleaning of the clamping assembly 50 and its components.

Figure 28:
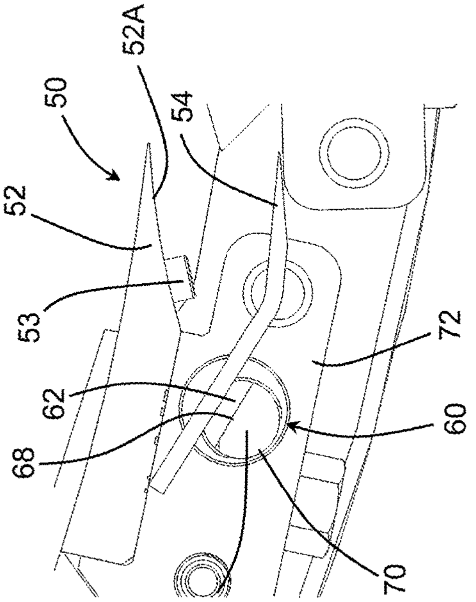
FIGS. 27 through 29 are fragmentary cross-sectional views of the cutting head of FIGS. 20 through 26 showing the eccentric cam rod rotated past the clamp release position of FIG. 26, and progressively show the removal of the clamp from the clamping assembly.
Figure 29:
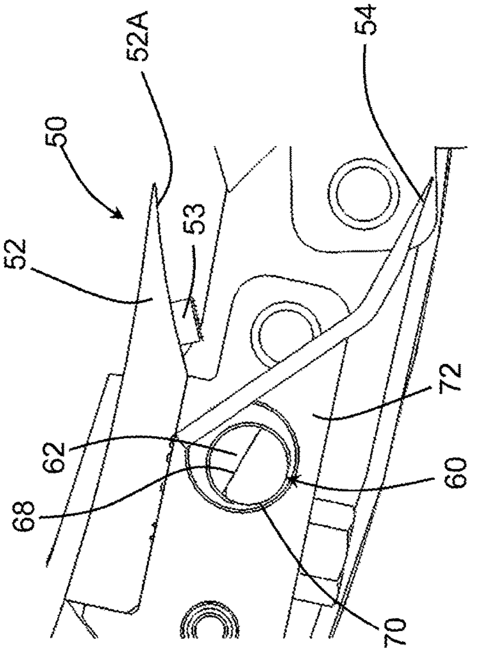
Figure 27:
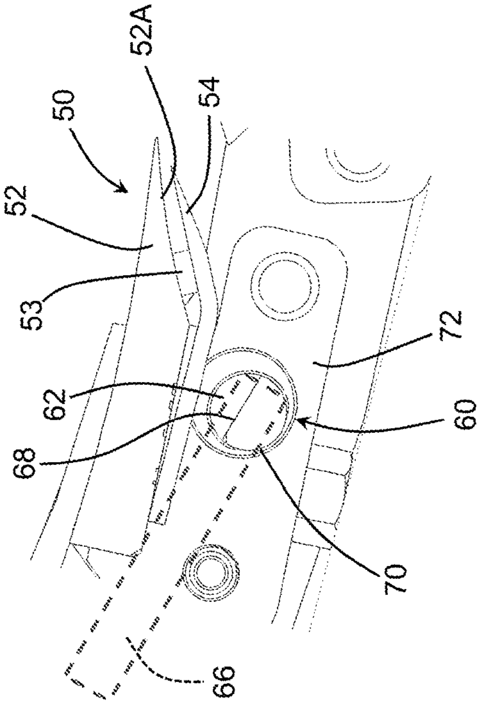

FIGS. 27 through 29 also schematically represent top views of a portion of the cutting head 12, but illustrate the cam rod 60 as having been rotated about its axis 61 beyond the clamp removal position depicted in FIG. 26 to a position roughly 240 degrees clockwise from the locked position depicted in FIGS. 20 and 22. As evident from FIGS. 27 through 29, the radial concavity 62 and recessed surface 68 of the cam rod 60 substantially face the clamp 54, creating a larger clearance therebetween to allow the clamp 54 to be easily removed from the clamping assembly 50. FIGS. 27 through 29 progressively show the removal of the clamp 54 from the clamping assembly 50.

The cam rod 60 of FIGS. 19 through 29 is further represented as having an optional clamp stop bar 88 having features 90 against which the trailing edge 54D of the clamp 54 can be located, which serves to accurately position the leading edge 54C of the clamp 54 in proximity to the leading edge of the knife holder 52.

FIGS. 30 through 49 depict knife replacement tools 100 that are capable of use with a variety of cutting machines, including but not limited to the centrifugal-type slicing machine 10 depicted in FIG. 1. Nonlimiting embodiments of the tools 100 will be illustrated and described hereinafter in reference to the slicing machine 10 equipped with a cutting head 12 and impeller 14 as described in reference to FIG. 1, as well as any of the cutting heads 12 described in reference to FIGS. 2 through 29. However, it will be appreciated that the tools 100 are also generally applicable to other types of cutting machines and cutting heads. Furthermore, the tools 100 are particularly adapted for, but not limited to, installing and removing strip-cut knives, including the strip-cut knives 20 described in reference to FIGS. 4 through 29. In view of similarities between the tools 100, consistent reference numbers are used in FIGS. 30 through 49 to identify the same or functionally related/equivalent elements of the tools 100.

A first embodiment of a knife replacement tool 100 is represented in FIGS. 30 through 36 as comprising a base 102, an actuator 104, and a handle 106. The base 102 is represented as having a generally elongate shape with a rectangular cross-section that defines, as viewed in FIGS. 30 through 33, what are referred to herein as a lower surface 108, an oppositely-disposed upper surface 110, a front surface 112, and an oppositely-disposed rear surface 114. The handle 106 is represented as secured to the base 102 with a threaded feature so as to maintain a fixed position relative to the base 102, whereas the actuator 104 is secured to the base 102 so as to be able to translate relative to the base 102 in translation directions that are roughly perpendicular to the lower surface 108.

In the nonlimiting embodiment represented in FIGS. 30 through 36, the base 102 has multiple parallel bores 116 that each receive a pin 118 extending from a bar 120 of the actuator 104. The bores 116 are open at the lower surface 108 such that a distal portion of each pin 118 is disposed adjacent the lower surface 108 of the base 102. The bores 116 and pins 118 are aligned parallel to the translation directions of the actuator 104 to effectuate the translation of the actuator 104 in the translation directions. In the embodiment shown, each bore 116 has a shoulder 122 and the pin 118 received therein has an opposing shoulder 124 to define a cavity within the bore 116 that surrounds the pin 118 and contains a compression spring 126 operable to bias the pin 118 toward the lower surface 108 of the base 102. Alternatively, it is foreseeable that the tool 100 could be operable with fewer than all bores 116 equipped with a spring 126. Though coil springs 126 are depicted, various other biasing means are foreseeable, as nonlimiting examples, one or more springs (including gas or hydraulic) and/or elastic members that apply a compression, tension, or torsion force and may operate through a lever or other intermediate mechanism.

The lengths of the pins 118 extending from the bar 120 of the actuator 104 relative to the lengths of their respective bores 116 are preferably such that a distal end 128 of each pin 118 is flush with or at least in close proximity to the lower surface 108 of the base 102 when the pins 118 are fully inserted into the bores 116 under the influence of the springs 126. A magnet 130 is received in a cavity located at the distal end 128 of each pin 118, such that each magnet 130 has an exposed surface 132 that is flush with or at least in close proximity to the lower surface 108 of the base 102. Various magnetic materials may be used for the magnets 130. Suitable magnetic materials are capable of producing a sufficiently strong magnetic field to magnetically capture a ferromagnetic body, in particular, the aforementioned clamps 54 and/or knives 20, placed against or in close proximity to the lower surface 108 of the base 102.

Figure 31:
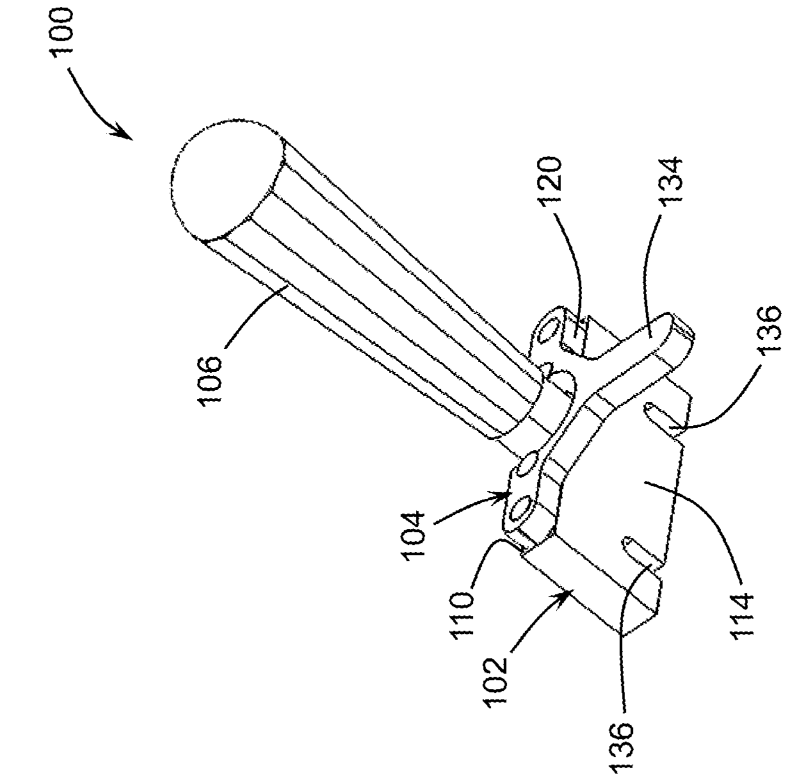
FIGS. 30 and 31 are perspective views representing a first knife replacement tool of a type capable of installing and removing the clamps and knives of any of FIGS. 4 through 29 from a cutting head of a slicing machine, such as but not limited to the slicing machine of FIG. 1, in accordance with a nonlimiting aspect of the invention.
Figure 30:
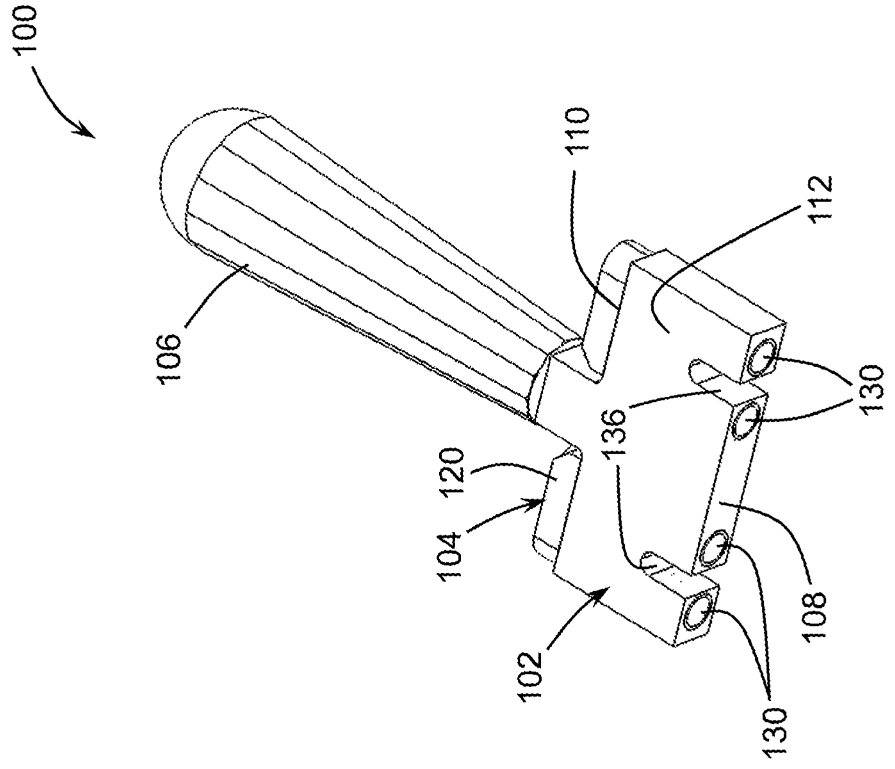
Figure 33:
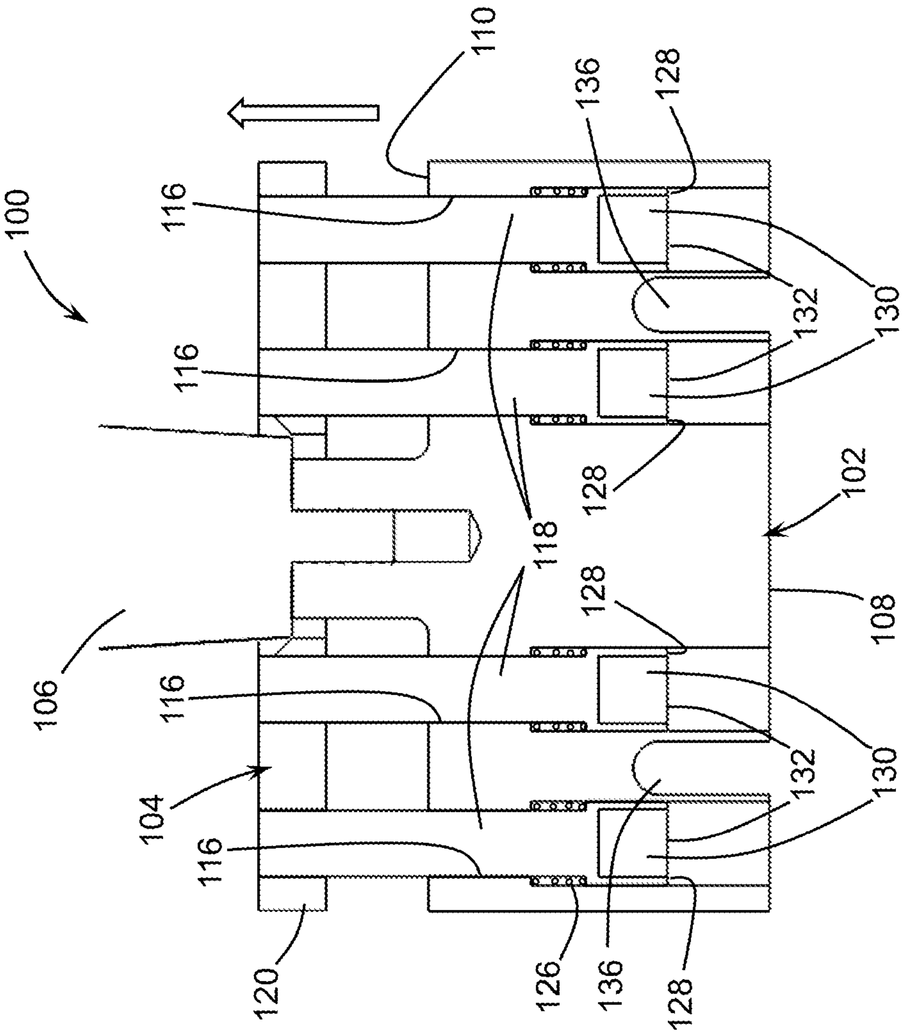

As seen in FIG. 31, the actuator 104 includes a trigger or tab 134 that protrudes from the bar 120 of the actuator 104, such that the tab 134 is disposed on the rear side of the base 102 and protrudes above the rear surface 114 of the base 102. The tab 134 and handle 106 are positioned and oriented relative to each other so that an operator gripping the handle 106 with their hand can simultaneously grasp and draw the tab 134 away from the base 102, causing the actuator 104 to translate away from the base 102 against the biasing effect of the springs 126 and causing the magnets 130 to be retracted into the bores 116 of the base 102, as represented in FIG. 33. In this position, the ability of the magnets 130 to capture a ferromagnetic body, for example, the knife 20 and/or clamp 54, is significantly attenuated, for example, to the extent that the magnets 130 are unable to hold the knife 20 and/or clamp 54 against the lower surface 108 of the base 102. Releasing the tab 134 allows the springs 126 to translate the actuator 104 toward the base 102 and cause its bar 120 to contact the upper surface 110 of the base 102, at which point the distal ends 128 and magnets 130 of the pins 118 are in proximity to the lower surface 108 of the base 102. In this position, the magnets 130 are able to capture and hold a ferromagnetic body, for example, the knife 20 and/or clamp 54, against the lower surface 108 of the base 102.

Figure 32:
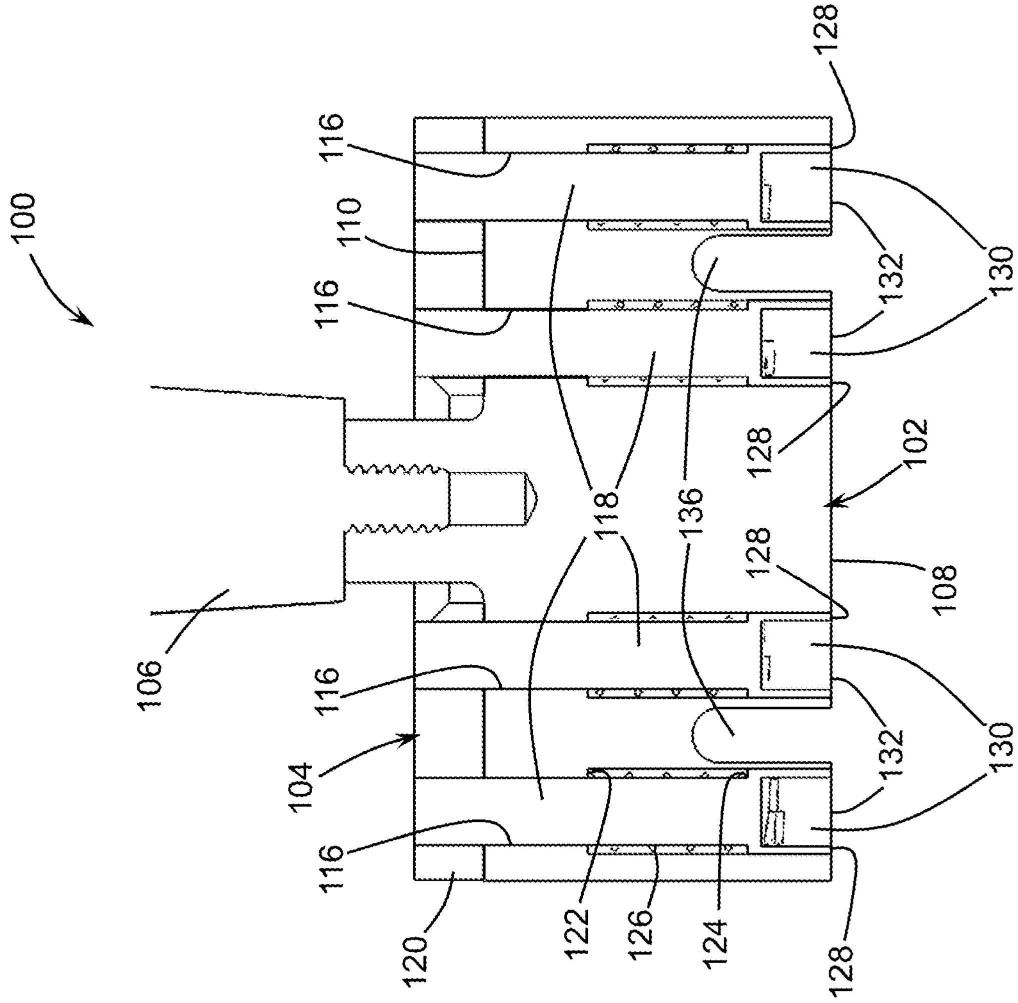
FIGS. 32 and 33 are fragmentary cross-sectional views representing the knife replacement tool of FIGS. 30 and 31 in, respectively, un-actuated position for magnetically engaging a clamp and an actuated position for magnetically releasing a clamp.
Figure 35:
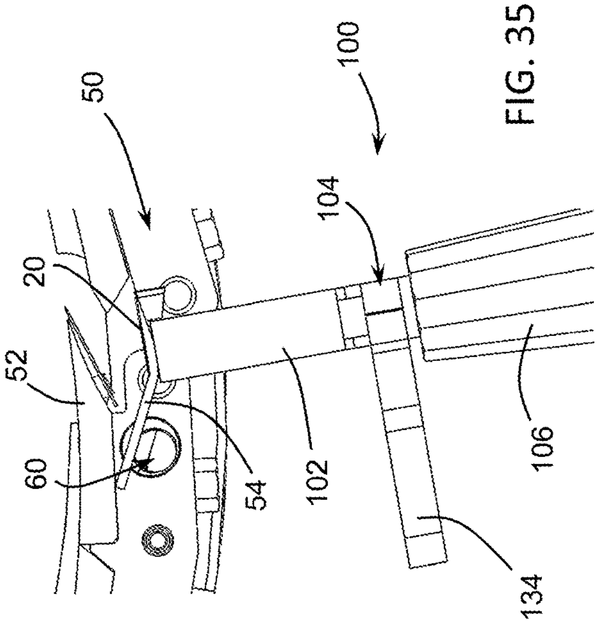
FIGS. 34 through 36 are perspective fragmentary views representing the knife replacement tool of FIGS. 30 through 33 magnetically engaging a clamp while installing or removing the clamp from a cutting head of a slicing machine, such as but not limited to the slicing machine of FIG. 1.
Figure 36:
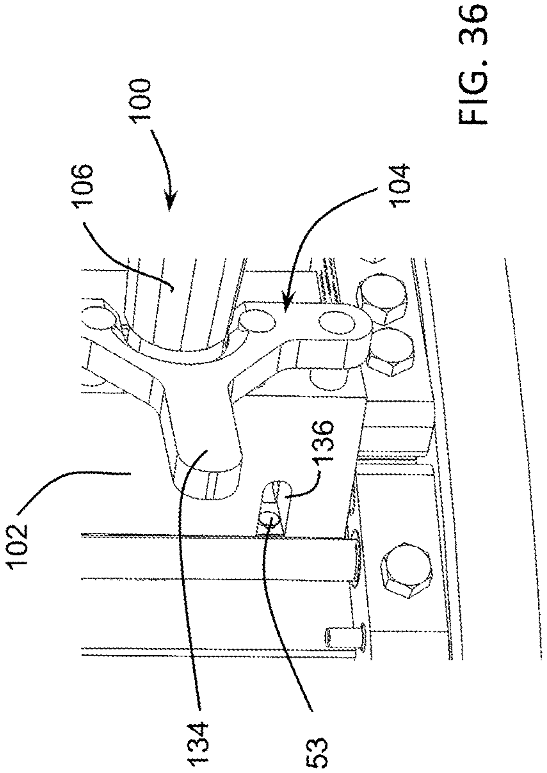
Figure 34:
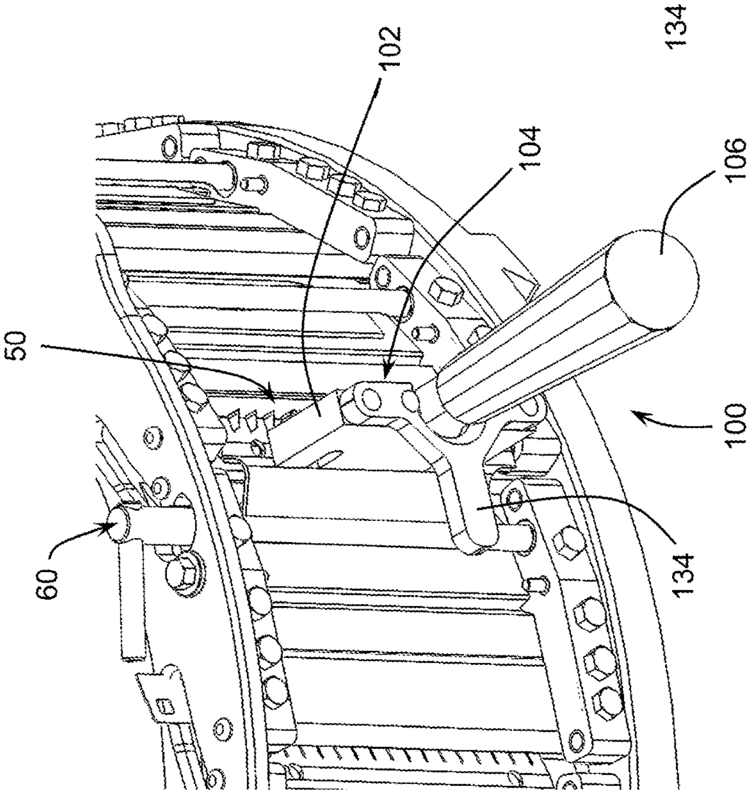
Figure 38:
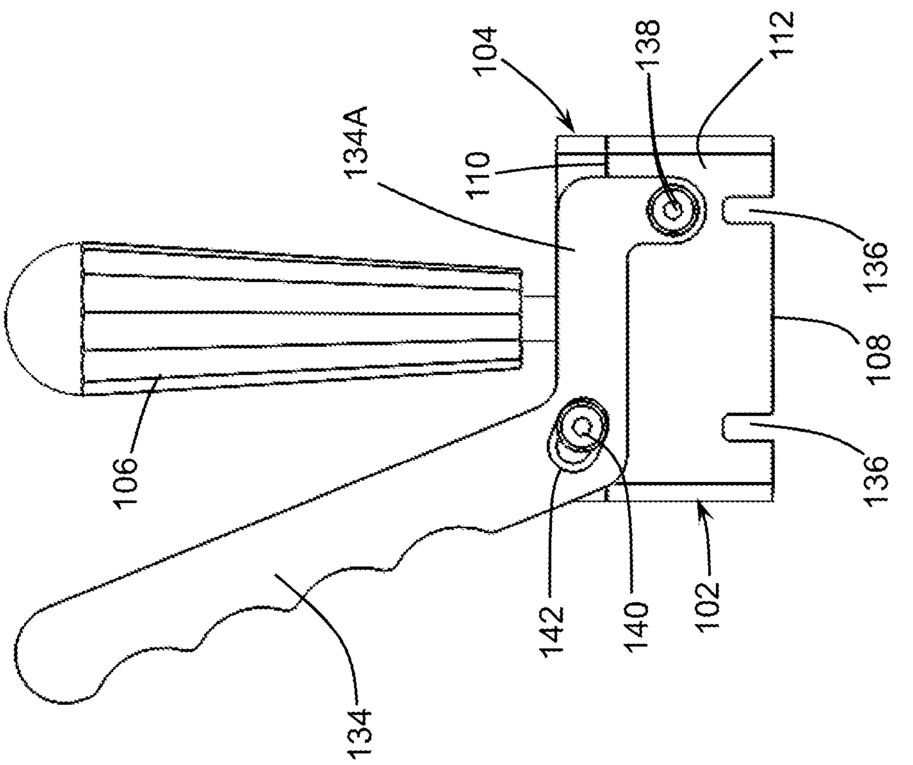
FIGS. 37 and 38 are perspective views representing a second knife replacement tool of a type capable of installing and removing the clamps and knives of any of FIGS. 4 through 29 from a cutting head of a slicing machine, such as but not limited to the slicing machine of FIG. 1, in accordance with another nonlimiting aspect of the invention.
Figure 37:
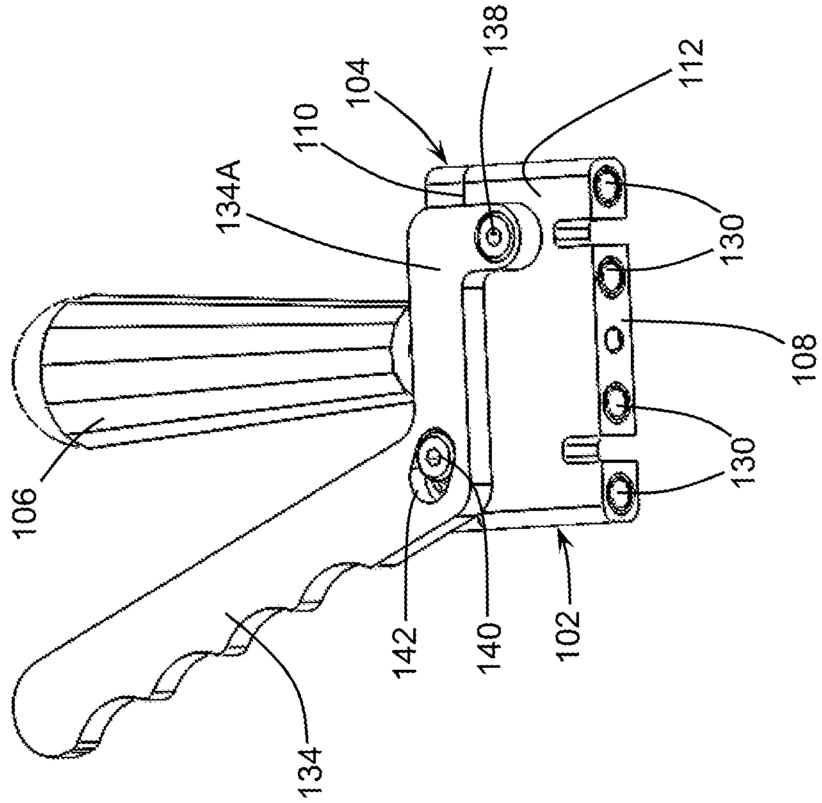
Figure 40:
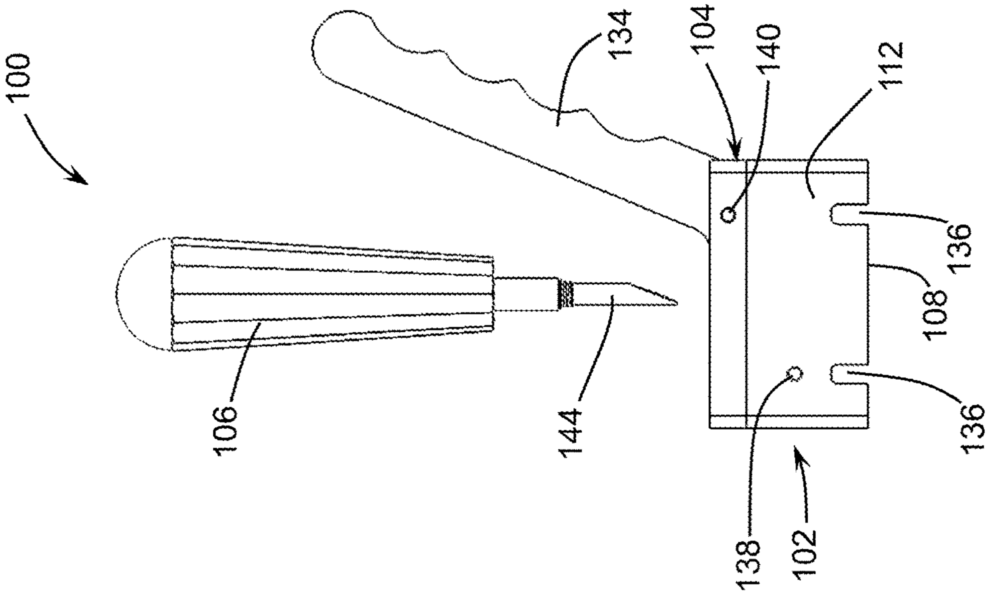
FIGS. 39 and 40 are, respectively, a fragmentary cross-sectional view and a side view of the knife replacement tool of FIGS. 37 and 38.
Figure 39:
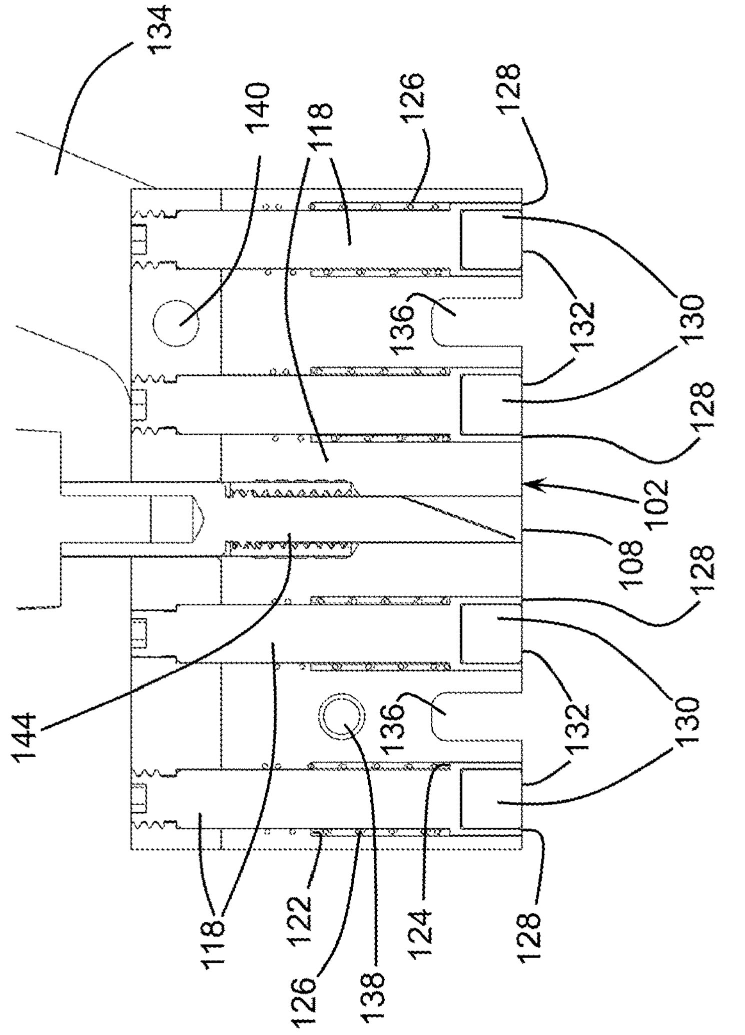
Figure 42:
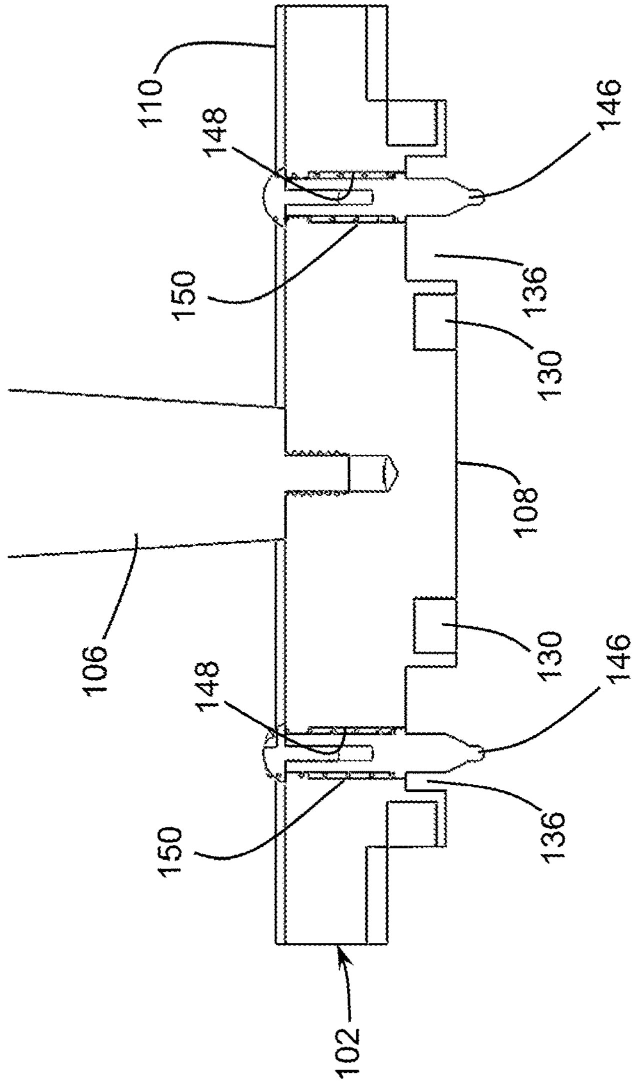
FIGS. 41 and 42 are, respectively, a perspective view and a fragmentary cross-sectional view of a third knife replacement tool of a type capable of installing and removing the clamps and knives of any of FIGS. 4 through 29 from a cutting head of a slicing machine, such as but not limited to the slicing machine of FIG. 1, in accordance with another nonlimiting aspect of the invention.
Figure 41:
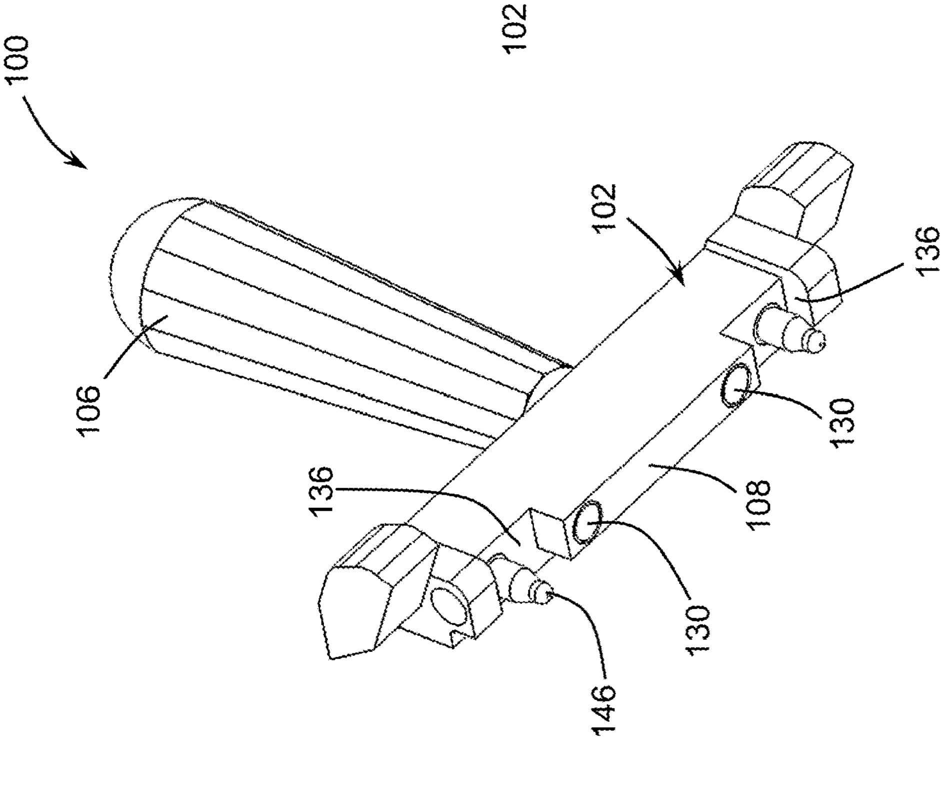

FIGS. 34 through 36 represent the use of the tool 100 to simultaneously capture a clamp 54 and knife 20 when the lower surface 108 of the base 102 is placed against or in close proximity to the clamp 54, with the pins 118 of the actuator 104 positioned relative to the base 102 so that the exposed surfaces 132 of the magnets 130 are flush with or in proximity to the lower surface 108 of the base 102 (FIG. 32). Slots 136 in the lower surface 108 of the base 102 enable the base 102 to straddle locating pins 53 that may be associated with the clamping assembly 50 as discussed in reference to FIG. 5, so that the lower surface 108 can brought into direct contact with the clamp 54, knife 20, etc. By grasping and drawing the tab 134 away from the base 102, the actuator 104 is caused to translate away from the base 102 against the biasing effect of the springs 126 as represented in FIG. 33, until the magnets 130 are sufficiently retracted into the bores 116 of the base 102 to release the clamp 54.

FIGS. 37 through 49 represent additional embodiments of knife replacement tools 100. The following discussion will focus primarily on aspects of the tools 100 of FIGS. 37 through 49 that differ from the tool 100 of FIGS. 30 through 36 in some notable or significant manner. Other aspects of the embodiments represented in FIGS. 37 through 49 that are not discussed in any detail may be, in terms of structure, function, materials, etc., essentially as was described for the embodiments of FIGS. 30 through 36.

The actuator 104 of the tool 100 of FIGS. 37 through 40 is operated through a trigger 134 that can be grasped by an operator while also gripping the handle 106 with their hand, and then drawn toward the handle 106 to cause the actuator 104 to translate away from the base 102 against the biasing effect of the springs 126 and cause the magnets 130 to be retracted into the bores 116 of the base 102, similar to what is represented in FIG. 33. This motion is the result of the trigger 134 being an extension of an arm 134A that is coupled to the base 102 and actuator 104 through a pivot pin 138 and cam follower 140 located on, respectively, the base 102 and actuator 104. The cam follower 140 resides within a cam slot 142 arm 134A to accommodate the linear translation of the actuator 104 relative to the arcuate path of the trigger 134 and arm 134A about the pivot pin 138. Releasing the trigger 134 allows the springs 126 to translate the actuator 104 toward the base 102 and retract the pins 118 into the base 102. The tool 100 of FIGS. 37 through 40 optionally has the additional feature of the handle 106 being removable (FIG. 40) and a pry bar 144 coupled to the handle 106 to assist with the removal of a clamp 54 or knife 20.

Figure 45:
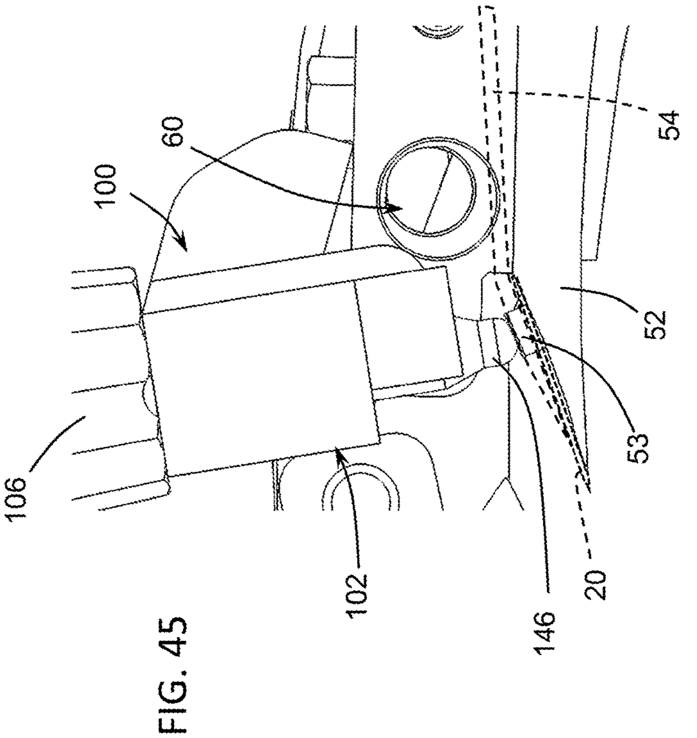
FIG. 45 is a perspective fragmentary cross-sectional view representing the knife replacement tool of FIGS. 41 through 44 magnetically engaging a clamp while installing or removing the clamp from a cutting head of a slicing machine, such as but not limited to the slicing machine of FIG. 1.
Figure 44:
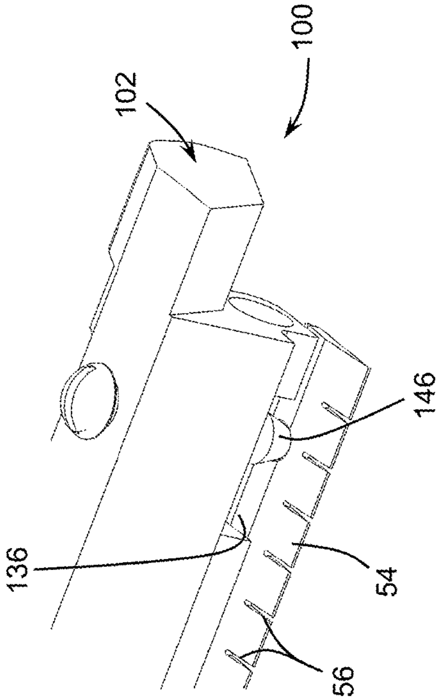
FIG. 44 is a perspective fragmentary view of the knife replacement tool of FIG. 41 through 43 magnetically engaging the clamp of FIG. 43.
Figure 43:
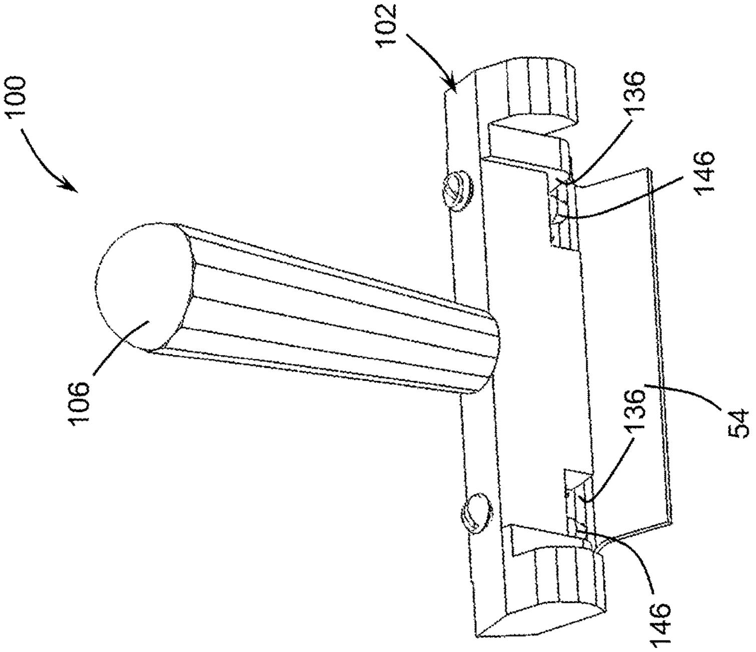
FIG. 43 is a perspective view representing the knife replacement tool of FIGS. 41 and 42 magnetically engaging a clamp.

The tool 100 of FIGS. 41 through 45 is not shown as equipped with the actuators 104 and tabs/triggers 134 of the previous embodiments. The tool 100 comprises a pair of locating pins 146 that reside within bores 148 within the base 102 and biased toward the lower surface 108 of the base 102 with springs 150. The locating pins 146 are located on the base 102 and sized to be simultaneously received in the locating holes 54E and 20C of the clamp 54 and knife 20 (e.g., FIG. 7 and FIGS. 4 and 12, respectively), enabling the clamp 54 and knife 20 to be accurately located on the tool 100 while held by the magnets 130 before and during the process of installing the clamp 54 and knife 20 on the knife holder 52. During installation, the locating pins 146 are aligned with the locating pins 53 of the knife holder 52, and then the tool 100 is pressed against the knife holder 52 to cause the locating pins 146 to retract into the base 102 against the biasing force of the springs 150 resulting in the transfer of the clamp 54 and knife 20 to the knife holder 52 and its locating pins 53, as is represented in FIG. 45.

The tool 100 of FIGS. 46 through 49 combines certain aspects of the tools 100 of FIGS. 30 through 45. For example, the tool 100 of FIGS. 46 through 49 comprises an actuator 104 reciprocably mounted to a base 102 with pins 118 similar to the embodiments of FIGS. 30 through 40, and locating pins 146 reciprocably mounted within the base 102 similar to the embodiment of FIGS. 41 through 45. The tool 100 of FIGS. 46 through 49 also incorporates magnets 130 (seen in FIGS. 48 and 49) mounted at distal ends of one or more of the pins 118, similar to the embodiments of FIGS. 30 through 40. As with the embodiment of FIGS. 41 through 45, the locating pins 146 are located on the base 102 and sized to be simultaneously received in the locating holes 54E and 20C of the clamp 54 and knife 20 (e.g., FIG. 7 and FIGS. 4 and 12, respectively), enabling the clamp 54 and knife 20 to be accurately located on the tool 100 during the process of installing the clamp 54 and knife 20 on the knife holder 52.

The tool 100 of FIGS. 46 through 49 is configured for translating the locating pins 146 relative to the pins 118 so that each locating pin 146 is at least partially retracted into a bore 148 when the magnets 130 of the pins 118 are biased toward the lower surface 108 of the base 102 by the springs 126, and for translating the locating pins 146 so that each locating pin 146 protrudes from the lower surface 108 of the base 102 when the magnets 130 are retracted into their bores 116 within the base 102.

Figure 47:
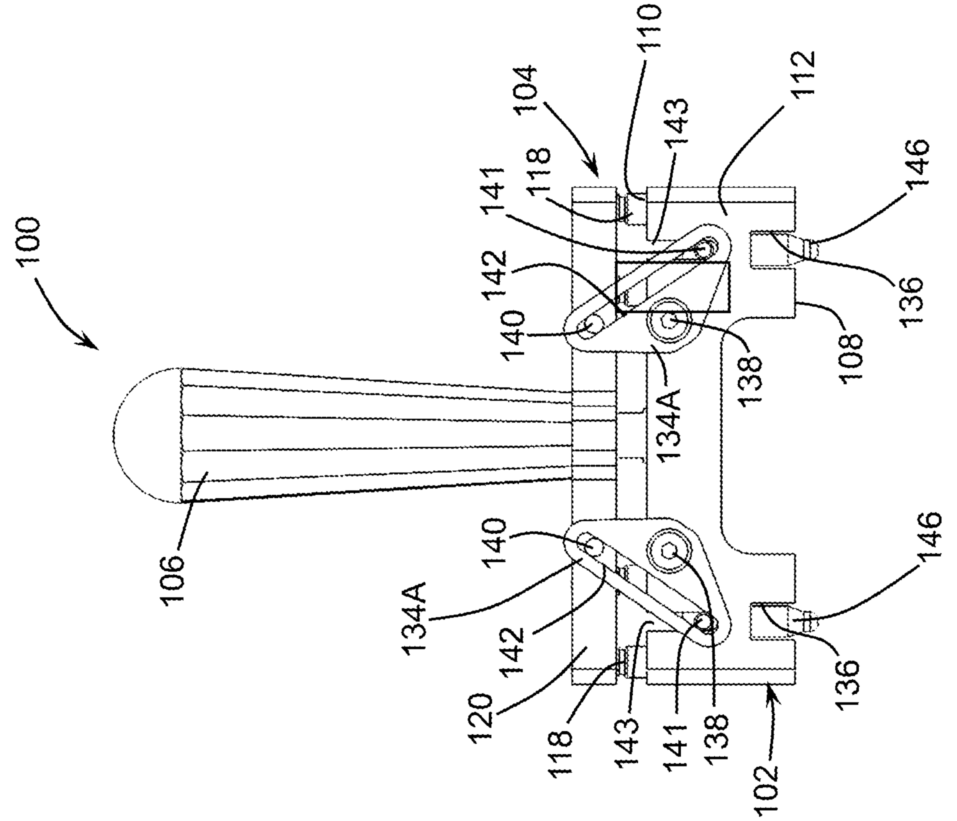
FIGS. 46 and 47 are side views representing of a fourth knife replacement tool of a type capable of installing and removing the clamps and knives of any of FIGS. 4 through 29 from a cutting head of a slicing machine, such as but not limited to the slicing machine of FIG. 1, wherein the knife replacement tool comprises certain features of the tools of FIGS. 30 through 45 in accordance with another nonlimiting aspect of the invention.
Figure 46:
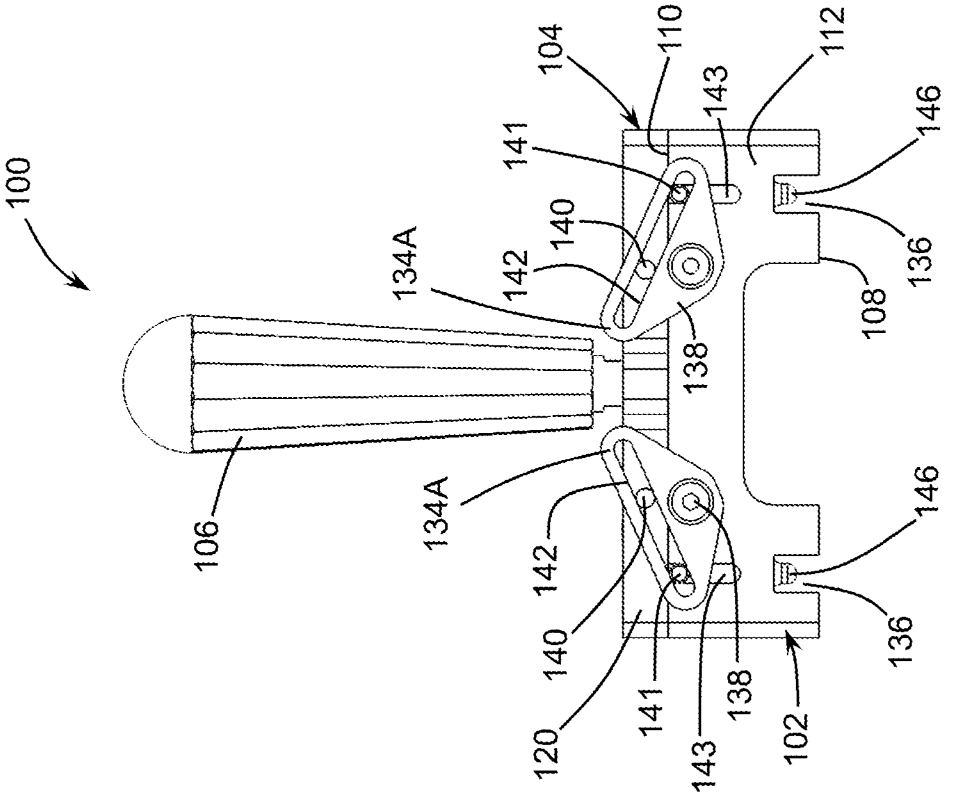
Figure 49:
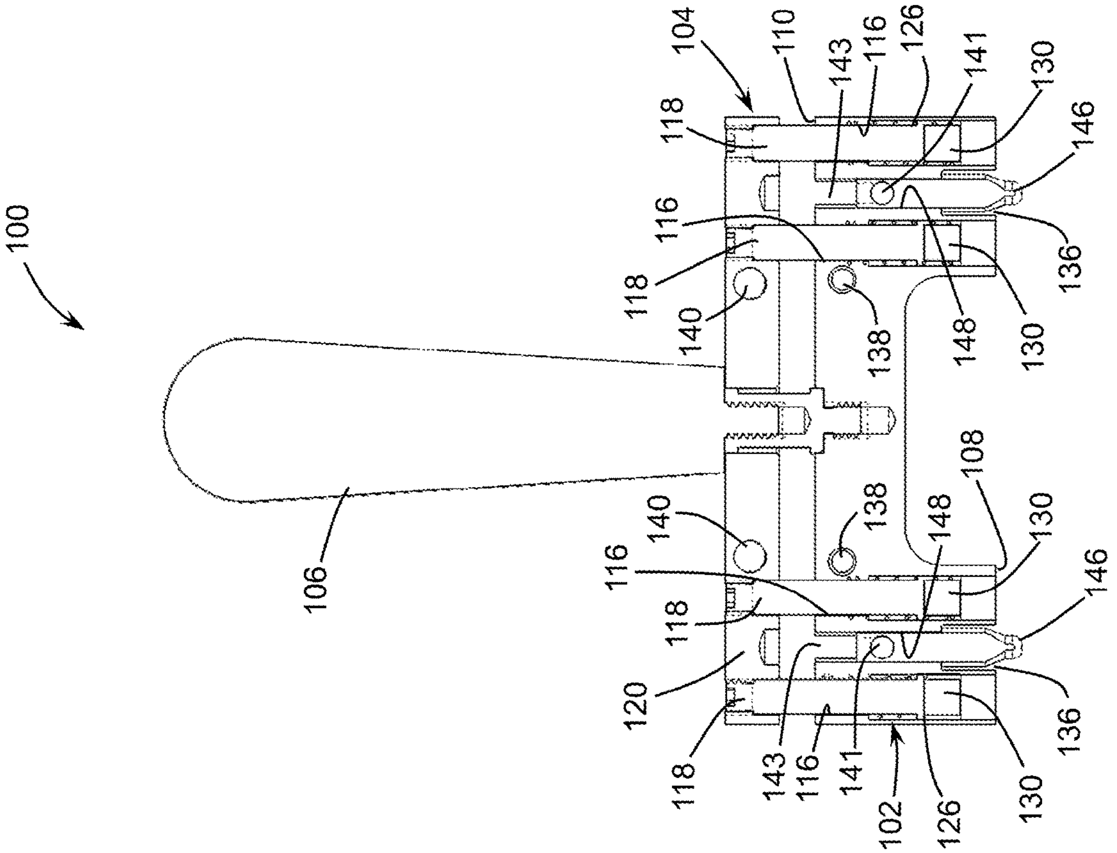
FIGS. 48 and 49 are fragmentary cross-sectional views representing the knife replacement tool of FIGS. 46 and 47 in, respectively, un-actuated position for magnetically engaging a clamp and an actuated position for magnetically releasing a clamp.
Figure 48:
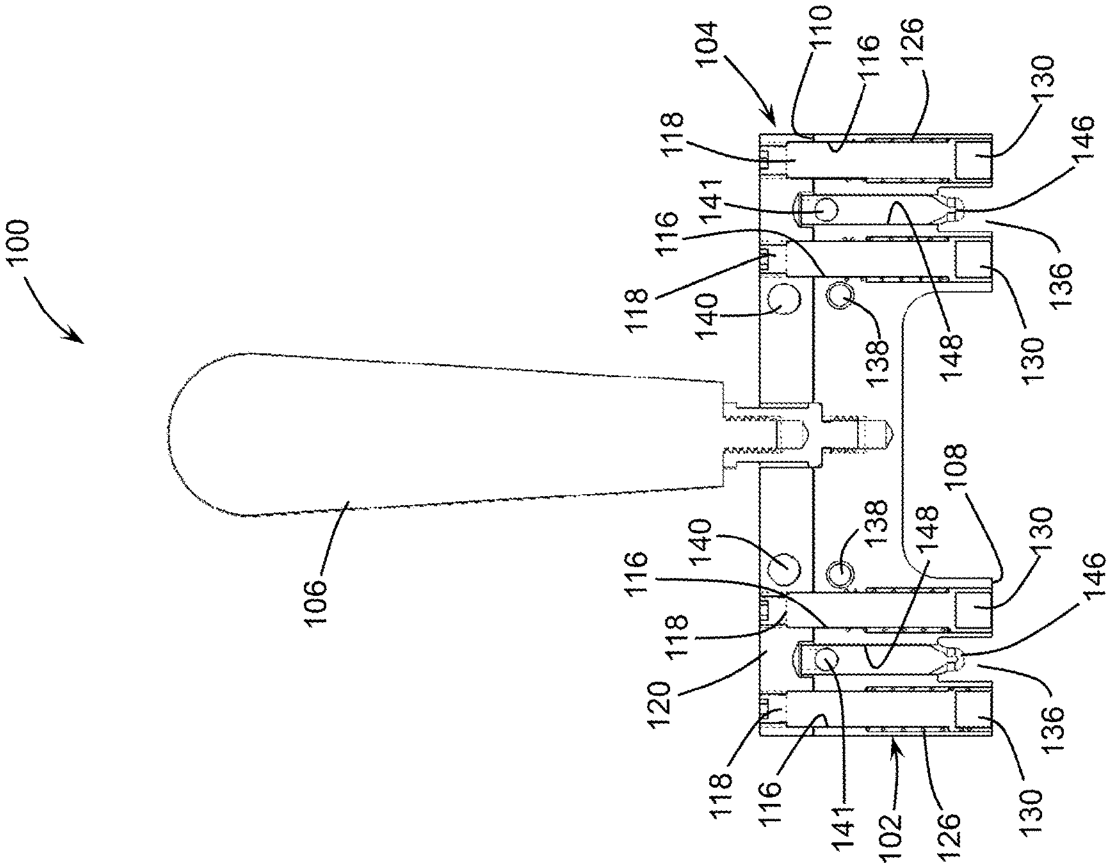

The magnets 130 and the locating pins 146 may be retracted into the base 102, for example, through the operation of a trigger (not shown) such as of the type shown for the tool 100 of FIGS. 30 through 36 that can be grasped by an operator while also gripping the handle 106 with their hand, and then drawn toward the handle 106 to cause the actuator 104 to translate away from the base 102 against the biasing effect of the springs 126 as represented in FIGS. 47 and 49. When the actuator 104 is positioned against the upper surface 110 of the base 102 (as represented in FIGS. 46 and 48), the magnets 130 are flush with or in proximity to the lower surface 108 of the base 102, as shown in FIG. 48. Translation of the actuator 104 away from the base 102 (as represented in FIGS. 47 and 49) causes the magnets 130 to retract into the bores 116 of the base 102, as shown in FIG. 49. The magnets 130 and locating pins 146 are interconnected such that retraction of the magnets 130 into the base 102 (resulting from the actuator 104 translating away from the base 102) causes an opposite motion of the locating pins 146, namely, extension of the locating pins 146 so that they protrude from the lower surface 108 of the base 102 as seen in FIG. 49. On the other hand, translation of the actuator 104 toward the base 102 translates the magnets 130 toward the lower surface 108 of the base 102 while also causing the locating pins 146 to retract into the base 102, as seen in FIG. 48. This operation enables the locating pins 46 to be out of the way when the clamp 54 is being held in place by the magnets 130, and therefore the locating pins 146 do not interfere with the locating pins 53 of the knife holder 52. However, while the magnets 130 are retracted, the locating pins 146 can be utilized to align the clamp 54 on the tool 100.

FIGS. 46 and 47 represent a nonlimiting embodiment of means for interconnecting the magnets 130 and locating pins 146 to cause the opposite motions within the base 102. In the illustrated embodiment, cam followers 141 are provided at the upper ends of the pins 146 and reside in slots 143 in the base 102. Each cam follower 141 is also received in a cam slot 142 in an arm 134A, in which a second cam follower 140 is received that is connected to the actuator 104. Motion of the actuator 104 is limited to reciprocation relative to the base 102 through the pins 118, which are received within the bores 116 in the base 102. The actuator 104 is biased away from the base 102 as shown in FIGS. 47 and 49 by the biasing effect of the springs 126 within the base 102 and associated within the pins 118, as seen in FIGS. 48 and 49. The locating pins 146 are biased to be retracted into the base 102 as shown in FIGS. 46 and 48 by the biasing effect of the springs 126 associated with the magnets 130 in combination with the interconnect of the magnets 130 and locating pins 146 through the arm 134A.

Under the influence of the springs 126, the actuator 104 contacts the upper surface 110 of the base 102, resulting in the appearance of the tool 100 as shown in FIGS. 46 and 48. During translation of the actuator 104 away from the base 102, the cam followers 140 and 141 reside within their respective cam slots 142 in the arm 134A to accommodate the linear translation of the actuator 104 and the locations of the locating pins 146, so that the arms 134A pivot about pivot pins 138 and cause the locating pins 146 to extend from the base 102 as the actuator 104 translates away the base 102, as evident from comparing FIGS. 46 and 47 and comparing FIGS. 48 and 49.

As previously noted above, though the foregoing detailed description describes certain aspects of one or more particular embodiments of the invention, alternatives could be adopted by one skilled in the art. For example, For example, the clamping assemblies 50 and tools 100 and cutting heads and machines in which they may be installed or used could differ in appearance and construction from what is shown in the drawings. Also, the clamping assemblies 50 and tools 100 could be used with knives that differ from what is shown in the drawings, for example, in terms of shape (flat or shaped) and, in the case of shaped knives, amplitude (distance from valley to peak) and/or pitch (distance between peaks). Furthermore, various materials and processes could be used in the manufacture of the clamping assemblies 50, tools 100, and their components. As such, and again as was previously noted, it should be understood that the invention is not necessarily limited to any particular embodiment described herein or illustrated in the drawings.

The invention claimed is:

1. A clamping assembly for securing a knife to a slicing machine, the clamping assembly comprising:

a knife holder having a surface and a leading edge;

a knife supported on the surface of the knife holder and having a cutting edge that protrudes from the leading edge of the knife holder;

a clamp arranged relative to the knife holder and knife to clamp the knife to the knife holder, the clamp having a longitudinal direction, a leading edge, a trailing edge, a knife-engaging portion adjacent the leading edge of the clamp, and a base portion adjacent the trailing edge of the clamp, at least part of the knife-engaging portion having a shape complementary to the knife; and a cam rod configured to apply a clamping load to the clamp to secure the knife to the knife holder, the cam rod being rotatable about a longitudinal axis thereof, the cam rod having a longitudinal length, a camming surface that engages the base portion of the clamp when the cam rod is rotated to a clamping position to force the clamp into engagement with the knife and clamp the knife against the knife holder, the cam rod having a radial concavity that has a longitudinal length and defines a recessed surface spanning at least a portion of the longitudinal length of the cam rod, the radial concavity being sized to accommodate the base portion of the clamp;

wherein the cam rod is rotatable about the longitudinal axis thereof from the clamping position to a knife release position in which the clamping load is sufficiently reduced to release the knife from the knife holder without removing the clamp;

wherein the cam rod is further rotatable about the longitudinal axis thereof beyond the knife release position so that a sufficient clearance is created between the clamp and the recessed surface of the cam rod to enable the clamp to be removed from the clamping assembly; and wherein the clamping assembly has a first stop that establishes the clamping position of the cam rod, the clamping assembly has a second stop that establishes the knife release position of the cam rod, the second stop comprises a step, the cam rod has a radially-projecting feature that bears against the first and second stops in the clamping and knife release positions, respectively, and the cam rod is translatable along the longitudinal axis thereof at the second stop so that the radially-projecting feature clears the step at the second stop to permit the cam rod to be further rotated beyond the knife release position so that a greater clearance is created between the clamp and the recessed surface of the cam rod;

wherein the clamping assembly further comprises a retaining element, the cam rod has an annular slot engaged by the retaining element, and the annular slot has an axial length sufficient to allow the cam rod to translate along the longitudinal axis thereof at the second stop so that the radially-projecting feature clears the step at the second stop while the annular slot remains engaged with the retaining element.

2. The clamping assembly of claim 1, wherein the knife is a strip-cut knife comprising tab blades that are oriented perpendicular to the cutting edge of the strip-cut knife.

3. The clamping assembly of claim 2, wherein the shape of the knife-engaging portion comprises slots that receive the tab blades of the knife.

4. The clamping assembly of claim 1, wherein the base portion of the clamp is centrally located along the longitudinal direction of the clamp.

5. The clamping assembly of claim 1, wherein the recessed surface is parallel to the longitudinal axis of the cam rod.

6. The clamping assembly of claim 1, wherein the knife-engaging portion and the base portion of the clamp each have a width in a direction parallel to the longitudinal direction of the clamp, the width of the base portion is less than the width of the knife-engaging portion, and the width of the base portion is less than the longitudinal length of the radial concavity such that the base portion of the clamp is received within the radial concavity.

7. The clamping assembly of claim 1, wherein the cam rod is still further rotatable about the longitudinal axis thereof beyond the knife release position so that a clearance greater that the sufficient clearance is created between the clamp and the recessed surface of the cam rod.

8. The clamping assembly of claim 1, further comprising a stop bar against which the trailing edge of the clamp is located to position the leading edge of the clamp in proximity to the leading edge of the knife holder.

9. A slicing machine equipped with the clamping assembly of claim 1.

* * * * *